US012786501B2

(12) United States Patent
Odayarkoil et al.

(10) Patent No.: US 12,786,501 B2
(45) Date of Patent: Nov. 3, 2026

(54) SYSTEMS AND METHODS FOR DYNAMICALLY MODIFYING COMPONENTS OF A PLAYBACK CONTROL GRAPHICAL USER INTERFACE ON A SECOND SCREEN DEVICE

(71) Applicant: Netflix, Inc., Los Gatos, CA (US)

(72) Inventors: Baskar Natarajan Odayarkoil, San Jose, CA (US); Benjamin Allan Johnson, San Jose, CA (US); Lucero Ruby Carmona, Aberdeen, MD (US); Edith Chao, San Francisco, CA (US); Wei Fen Lee, New York, NY (US); Geoffrey Mason House, Alameda, CA (US); Jeremy Kelly, Santa Clara, CA (US); Terrence John Doornbos, Daly City, CA (US); Srdjan Pantic, Santa Clara, CA (US); Marshall Brian Upshur, Buford, GA (US); John Charlton Fox, San Francisco, CA (US); Anagha Satish Dhole, Burlingame, CA (US); Gary Luke Chan, San Ramon, CA (US); Ivan Gennadievich Provalov, Scotts Valley, CA (US)

(73) Assignee: Netflix, Inc., Los Gatos, CA (US)

( * ) Notice: Subject to any disclaimer, the term of this patent is extended or adjusted under 35 U.S.C. 154(b) by 75 days.

(21) Appl. No.: 18/496,286

(22) Filed: Oct. 27, 2023

(65) Prior Publication Data

US 2025/0142153 A1 May 1, 2025

(51) Int. Cl.

*H04N 21/422* (2011.01)
*G06F 3/04842* (2022.01)
*H04M 1/72415* (2021.01)

(52) U.S. Cl.

CPC ..... *H04N 21/4222* (2013.01); *G06F 3/04842* (2013.01); *H04M 1/72415* (2021.01)

(58) Field of Classification Search

CPC ........... H04N 21/4222; H04M 1/72415; G06F 3/04842

See application file for complete search history.

(56) References Cited

U.S. PATENT DOCUMENTS

2012/0054616 A1* 3/2012 Mittal .................. G06F 16/957 715/722
2012/0159327 A1* 6/2012 Law ................ H04N 21/47217 715/716

(Continued)

OTHER PUBLICATIONS

International Search Report and Written Opinion for International PCT Application No. PCT/US2024/053209, mailed Dec. 20, 2024; 12 pages.

*Primary Examiner* — Joshua D Taylor
(74) *Attorney, Agent, or Firm* — Hogan Lovells Cadwalader US LLP

(57) ABSTRACT

The disclosed computer-implemented methods and systems can enable simultaneous interactions with a single media item via two or more display devices. For example, the methods and systems discussed herein pair two or more display devices under the same digital content system account. Once paired, the methods and systems discussed herein enable interactions with media items via the two or more display devices. For example, the methods and systems enable a viewer to watch a media item on a first display device while scrubbing to a different playback position within the media item on a second display device. Various other methods, systems, and computer-readable media are also disclosed.

20 Claims, 26 Drawing Sheets

(56) References Cited

U.S. PATENT DOCUMENTS

| | | | | |
|---|---|---|---|---|
| 2013/0191757 | A1* | 7/2013 | Smith | H04N 21/6125<br>715/835 |
| 2014/0150023 | A1 | 5/2014 | Gudorf | |
| 2014/0259061 | A1* | 9/2014 | Delpuch | H04N 21/8355<br>725/37 |
| 2015/0319506 | A1 | 11/2015 | Kansara | |
| 2017/0230705 | A1* | 8/2017 | Pardue | H04N 21/42222 |
| 2020/0304863 | A1* | 9/2020 | Domm | G06F 3/04886 |
| 2021/0144444 | A1 | 5/2021 | Kaliamoorthi | |
| 2022/0147562 | A1* | 5/2022 | Fuzell-Casey | G06F 21/6218 |
| 2023/0120103 | A1* | 4/2023 | Wang | H04N 21/488<br>455/418 |

* cited by examiner

FIG. 5A
124
302
9:41
For Mike
TV shows
Movies
Categories
N SERIES
THE WITCHER
Exciting ◦ Visully Striking ◦ Fantasy TV
Play
My List
Popular on Netflix
502
BEEF
S1 .E2 "The Rapture of..."
Home
New & Hot
Downloads

SYSTEMS AND METHODS FOR DYNAMICALLY MODIFYING COMPONENTS OF A PLAYBACK CONTROL GRAPHICAL USER INTERFACE ON A SECOND SCREEN DEVICE

Watching streamed media content is increasingly popular and commonplace. For example, a viewer may subscribe to a streaming service and watch media items offered by that service from one or more display devices associated with the viewer's subscription account. To illustrate, the viewer may watch a selected media item (e.g., a TV show or movie) on a television. For example, the viewer's television may be wirelessly enabled to receive streamed content directly from the streaming service. In some examples, the viewer may have their television connected to any type of set-top receiver that receives the streamed media content and displays media content items via the television.

In addition to viewing streamed media content via a television, some streaming services offer additional ways to watch streamed media content. For example, some streaming services can stream media items to other types of display devices such as smartphones, tablet computers, laptop computers, smart wearables, and so forth. With these additional viewing options, viewers may watch streamed media items in multiple ways.

Despite this, most streaming services limit viewer interactions with media content items to one display device at a time. For example, most streaming services allow viewers to browse, select, watch, etc. media content items on their TV (e.g., by using a remote control) or on their smartphone (e.g., using touch gestures), but not both simultaneously. As such, these streaming services fail to provide a way for viewers to interact with media content items simultaneously via more than one display device.

SUMMARY

As will be described in greater detail below, the present disclosure describes implementations that enable viewers to have rich interactions with media items via more than one display device. For example, implementations include pairing a first screen device displaying a media item and a second screen device acting as a controller relative to the media item, determining a context associated with the media item, generating, based on the context, instructions to modify one or more components of a playback control graphical user interface displayed by the second screen device, and transmitting the instructions to the second screen device to trigger modification of the one or more components of the playback control graphical user interface.

In some examples, the implementations further include pairing the first screen device displaying the media item and the second screen device acting as the controller by receiving a device subscription request from the first screen device, generating a device subscription list including the first screen device, receiving a device subscription request from the second screen device, adding the second screen device to the device subscription list, transmitting the device subscription list to the first screen device, and in response to receiving a request from the first screen device to pair with the second screen device, associating the first screen device and the second screen device.

Some examples further include, in response to associating the first screen device and the second screen device, receiving one or more messages from the first screen device and pushing the one or more messages to the second screen device. In at least one example, pairing the first screen device and the second screen device is in response to a detected selection of the first screen device from a pairing option list displayed by the second screen device.

Some examples also include, in response to pairing the first screen device and the second screen device, causing the second screen device to display an indication of successful pairing within the playback control graphical user interface displayed by the second screen device and causing the first screen device to display the indication of successful pairing within a media item graphical user interface displayed by the first screen device.

In some examples, implementations further include generating instructions to display the playback control graphical user interface on the second screen device, wherein the instructions to display the playback control graphical user interface are based on whether the media item is a standalone media item or an episodic media item. In at least one example, determining the context associated with the media item includes at least one of: determining that playback of the media item has been initiated, determining that playback of the media item has entered an introduction portion of the media item, determining that the media item is a last episode in a collection of episodes, or determining that a subtitle selection associated with the media item has been made.

In some examples, implementations further include detecting one or more user selections of components within the playback control graphical user interface on the second screen device, and communicating the detected one or more selections to the first screen device. In at least one example, generating instructions to modify one or more components of the playback control graphical user interface includes one or more of: generating instructions to provide a new component within the playback control graphical user interface, generating instructions to highlight an existing component within the playback control graphical user interface, generating instructions to modify an existing component within the playback control graphical user interface, or generating instructions to update a position of a playback scrubber within the playback control graphical user interface.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including pairing a first screen device displaying a media item and a second screen device acting as a controller relative to the media item, determining a context associated with the media item, generating, based on the context, instructions to modify one or more components of a playback control graphical user interface displayed by the second screen device, and transmitting the instructions to the second screen device to trigger modification of the one or more components of the playback control graphical user interface.

In additional examples, implementations include receiving, at a second screen device via digital content system application, instructions to generate a control graphical user interface associated with a media item displayed on a first screen device, transmitting, in response to a detected selection of a pause/play button within the control graphical user interface, an electronic communication that initiates playback of the media item, receiving, at the second screen device via the digital content system application, instructions that trigger one or more modifications of the control graphical user interface based on playback of the media item entering an introduction portion of the media item, and modifying the control graphical user interface based on the received instructions. Some implementations further include receiving, at the second screen device via the digital content system application, additional instructions that trigger additional modifications of the control graphical user interface based on playback of the media item moving past the introduction portion of the media item, and modifying the control graphical user interface based on the received additional instructions.

In one or more examples, features from any of the implementations described herein are used in combination with one another in accordance with the general principles described herein. These and other implementations, features, and advantages will be more fully understood upon reading the following detailed description in conjunction with the accompanying drawings and claims.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
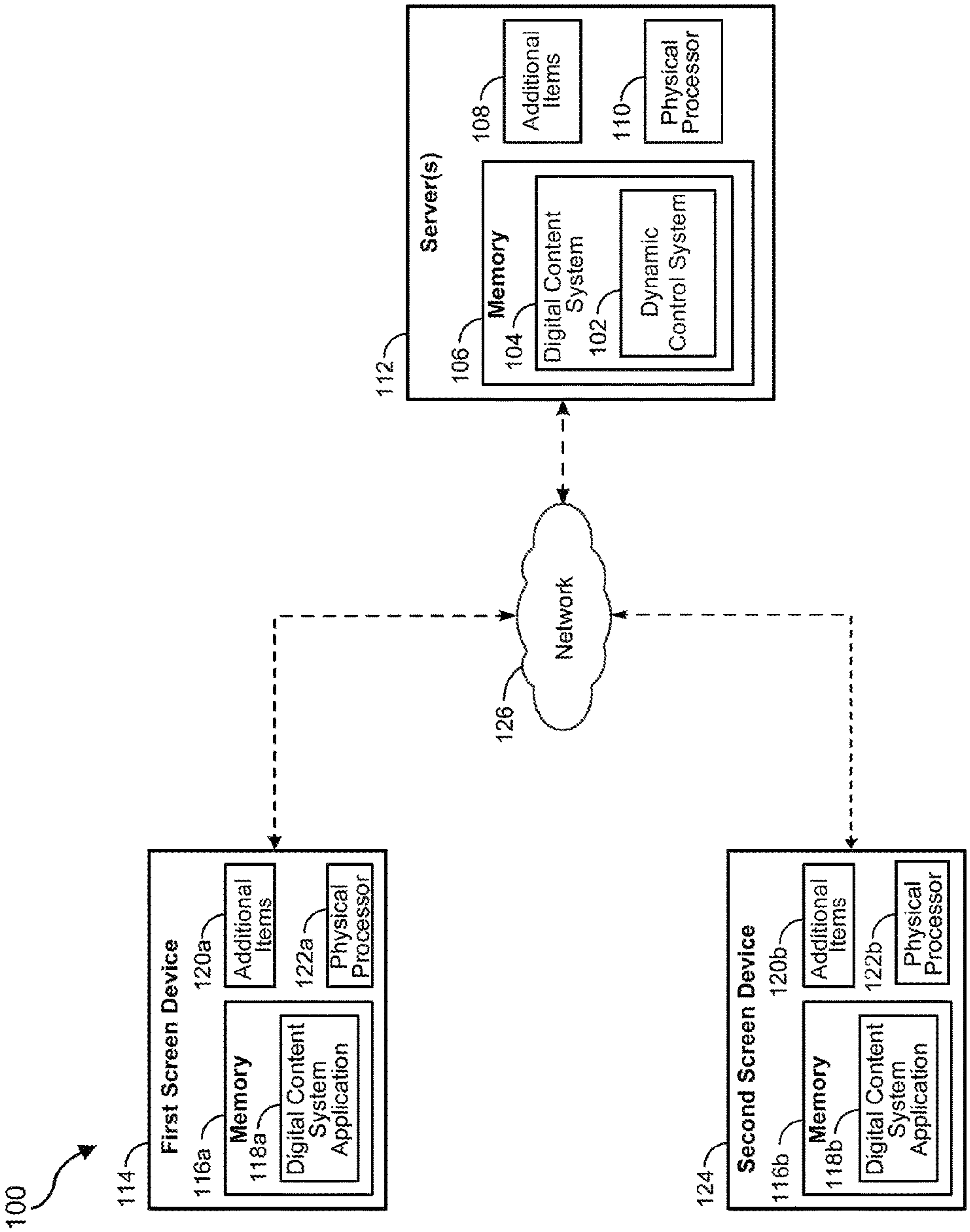
FIG. 1 illustrates a block diagram of an exemplary environment for implementing a dynamic control system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, most digital content streaming services limit the ways that a viewer can interact with a media item. To illustrate, a typical digital content streaming service enables viewers to use a remote control to browse media items, select media items, and initiate media item playback via their televisions. Similarly, the typical digital content streaming service enables viewers to use touch gestures to browse, select, and play media items via their smartphone or tablet computer. As such, typical digital content streaming services limit the streaming experiences of their viewers to one single screen device at a time-meaning viewers often have to pause playback of a media item to change language and subtitle settings, explore additional episode summaries, browse additional media items, etc. Moreover, some digital content streaming services often provide language-changing services, episode overviews, subtitle selections, etc. in a way that overlays the main playback window such that playback of a media item is obscured from view.

In light of this, the present disclosure describes a system that enables simultaneous interactions with a single media item via two or more screen devices. For example, the disclosed system pairs a first screen device (e.g., a TV) and a second screen device (e.g., a smartphone). The disclosed system then enables interactions with a media item (e.g., a digital movie) via both display devices. To illustrate, the disclosed system enables a viewer to browse and select the media item via the second screen device for playback on the first screen device. During playback, the disclosed system further generates a context-aware playback control graphical user interface on the second screen device via which the viewer continues to interact with the media item by pausing and scrubbing media item playback, skipping predetermined portions of the media item, configuring language and subtitle settings, advancing episodes, and so forth. Additionally, the disclosed system utilizes the playback control graphical user interface on the second screen device such that playback on the first screen device is unobscured and easy to view. As such, the disclosed system leverages multiple screen devices to enrich and deepen the viewer's experience with the media item and to add flexibility and additional functionality to media item playback beyond what was previously available.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
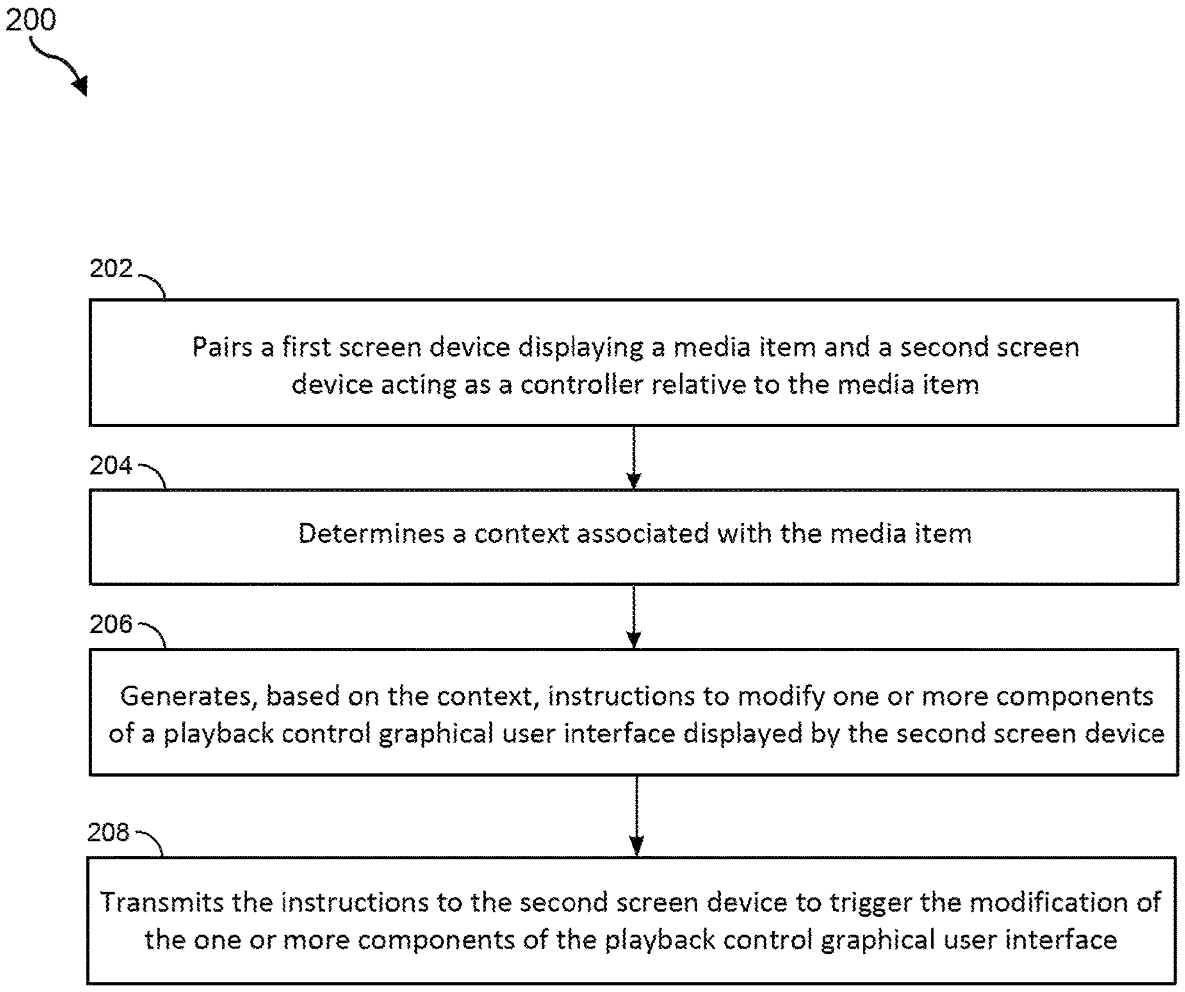
FIG. 2 illustrates a flow diagram of an exemplary computer-implemented method for dynamically modifying components of a playback control graphical user interface based on media item context in accordance with one or more implementations.
Figure 6A:
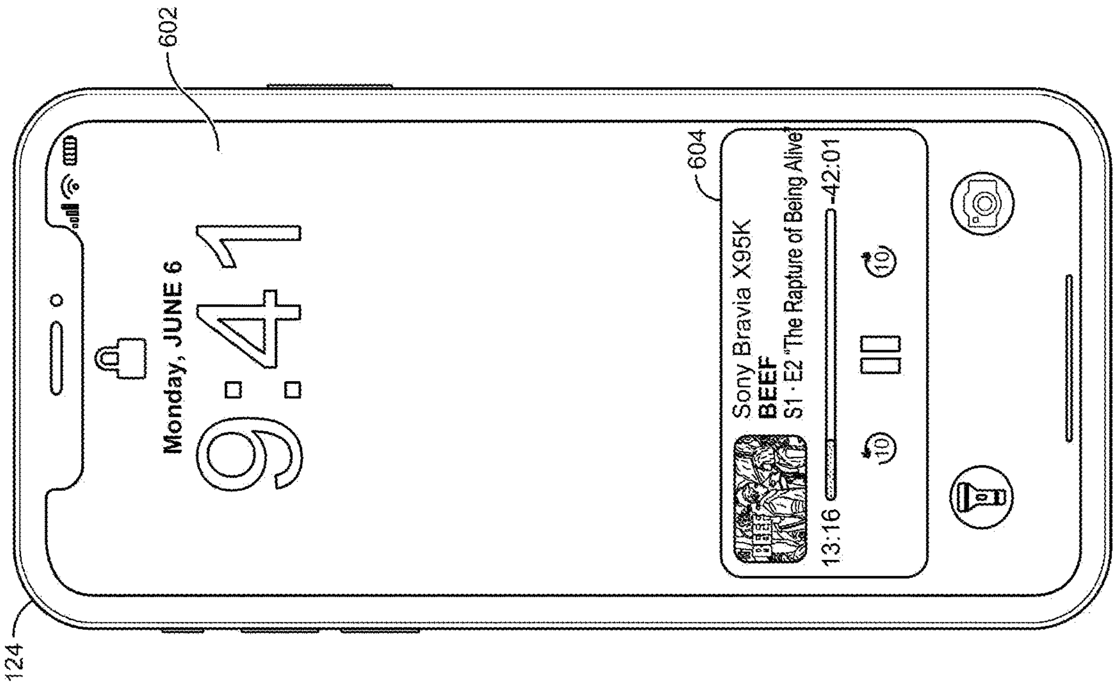
FIGS. 6A-6C illustrate lock screen graphical components generated by the dynamic control system in accordance with one or more implementations.
Figure 6C:
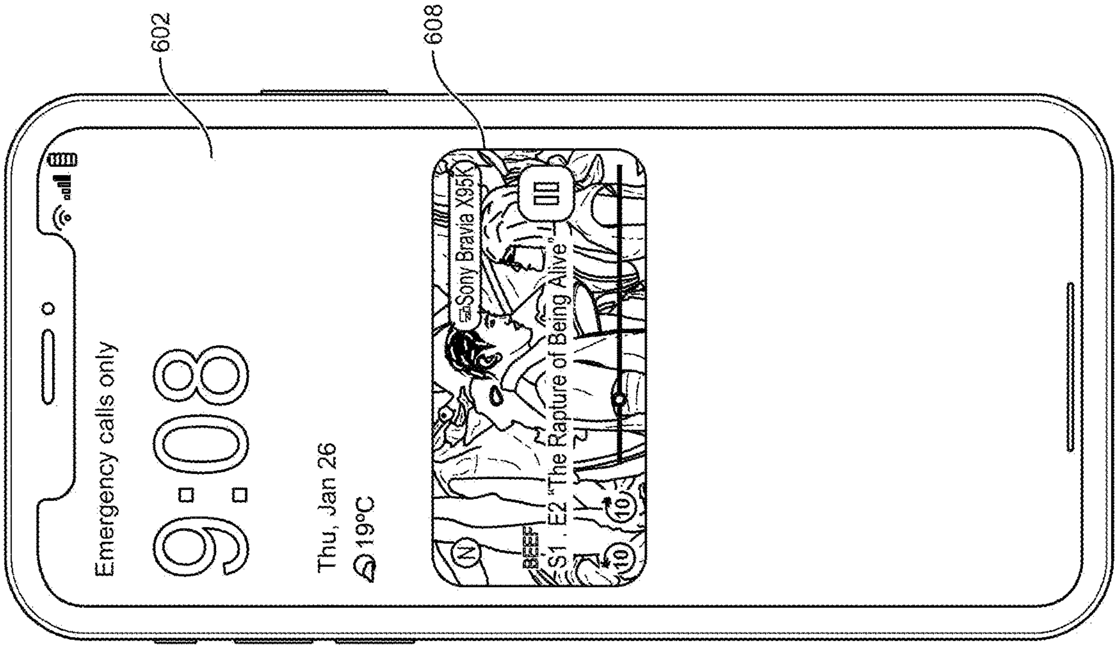
Figure 6B:
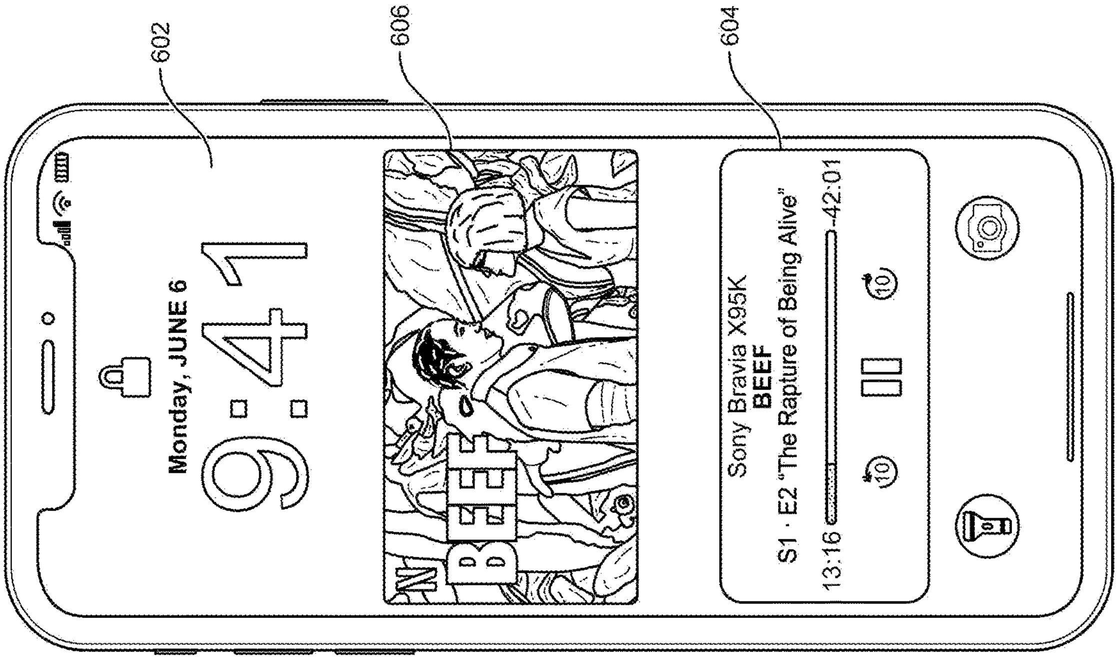
Figure 7A:
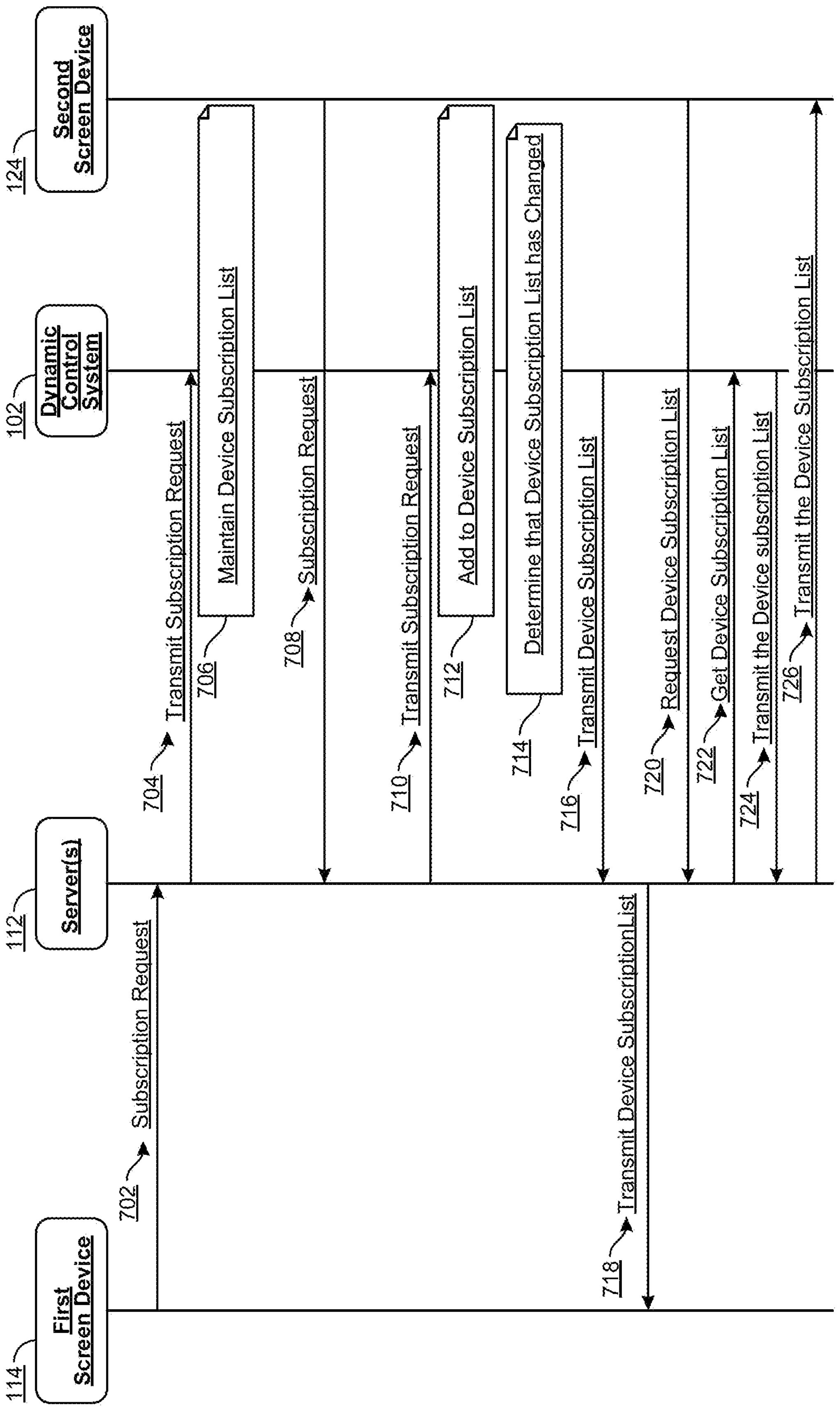
FIGS. 7A-7B illustrate pairing and communication diagrams implemented by the dynamic control system in accordance with one or more implementations.
Figure 7B:
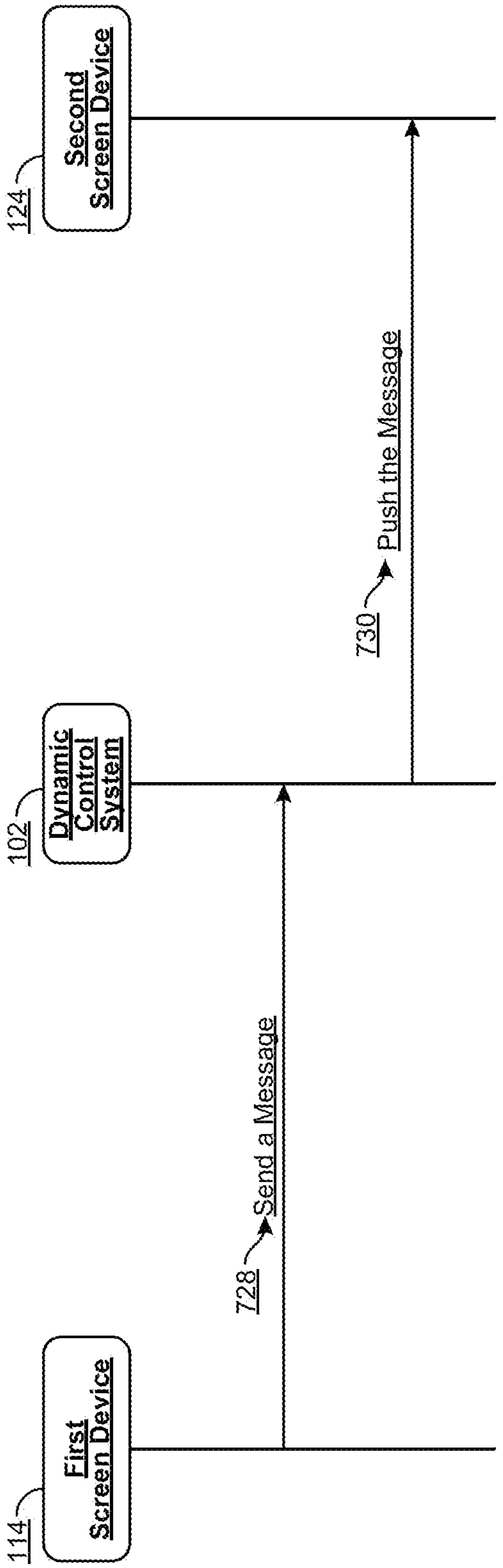
Figure 8:
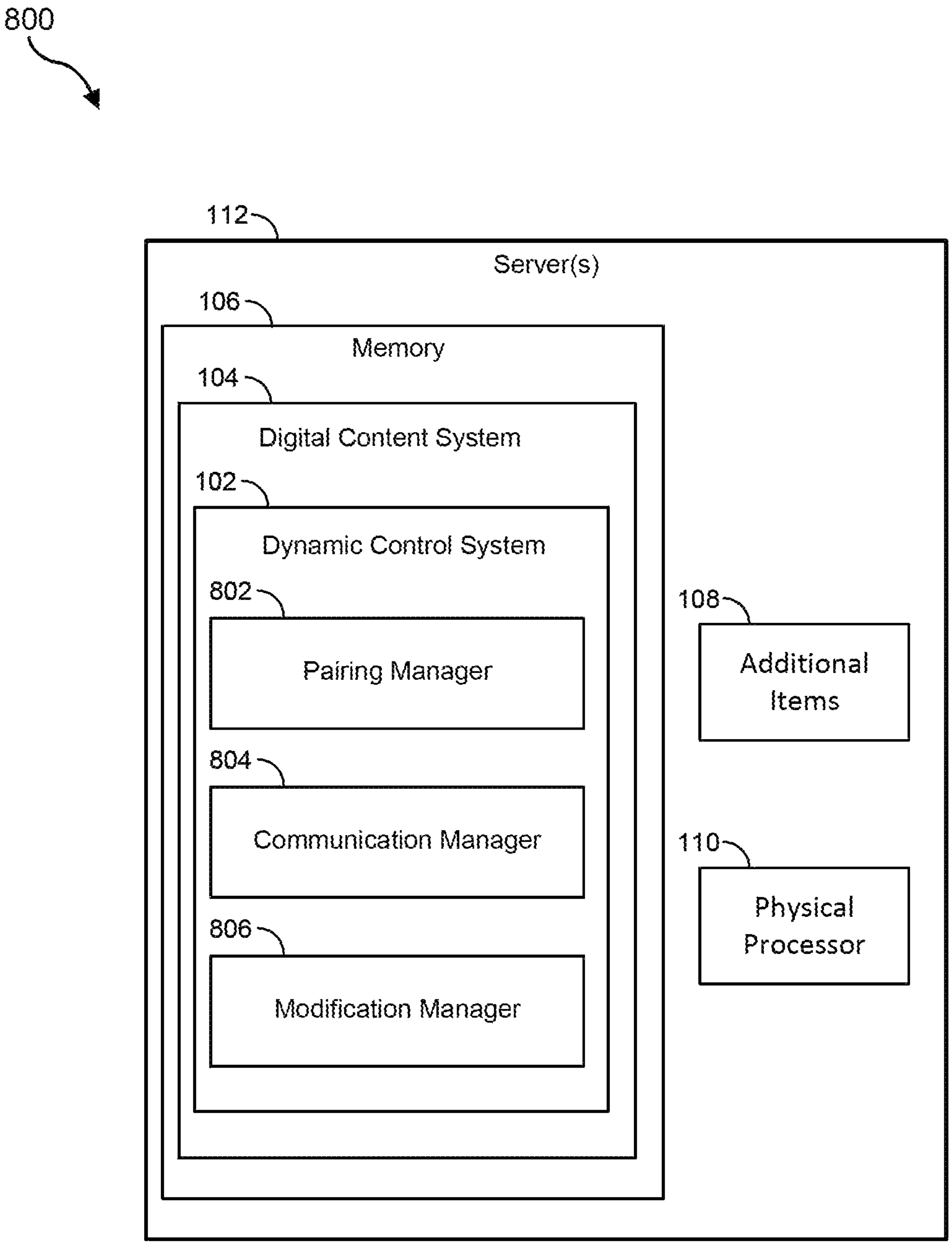
FIG. 8 illustrates a detailed diagram of the dynamic control system in accordance with one or more implementations.
Figure 9:
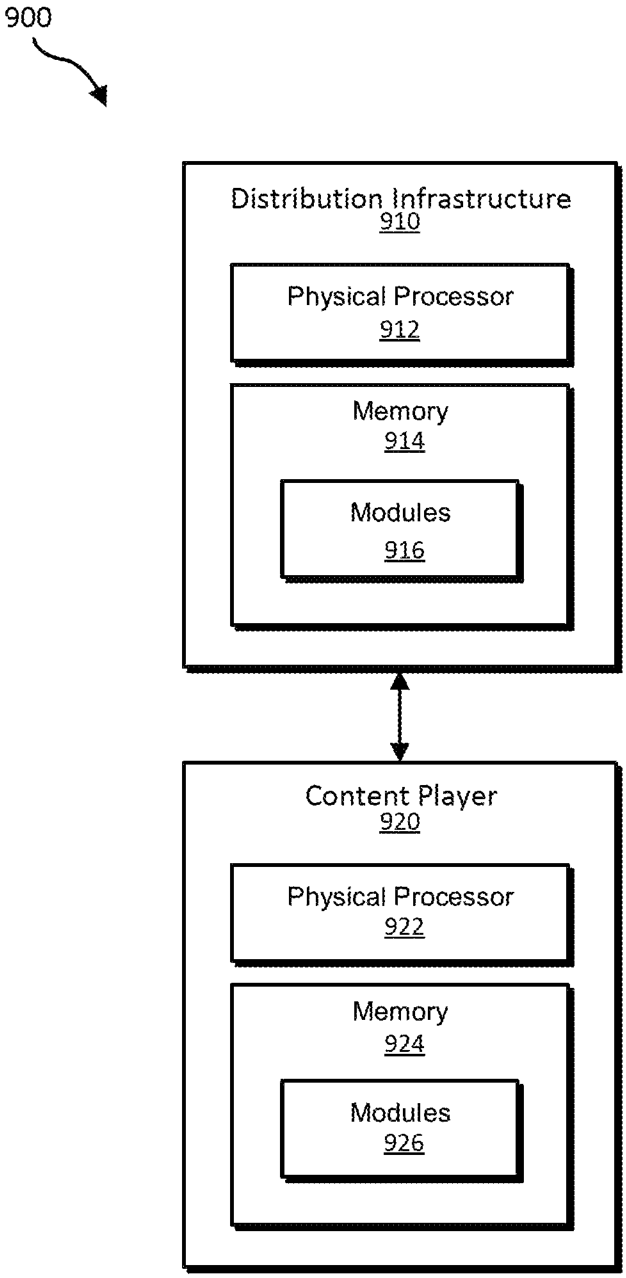
FIG. 9 illustrates a block diagram of an exemplary content distribution ecosystem.
Figure 10:
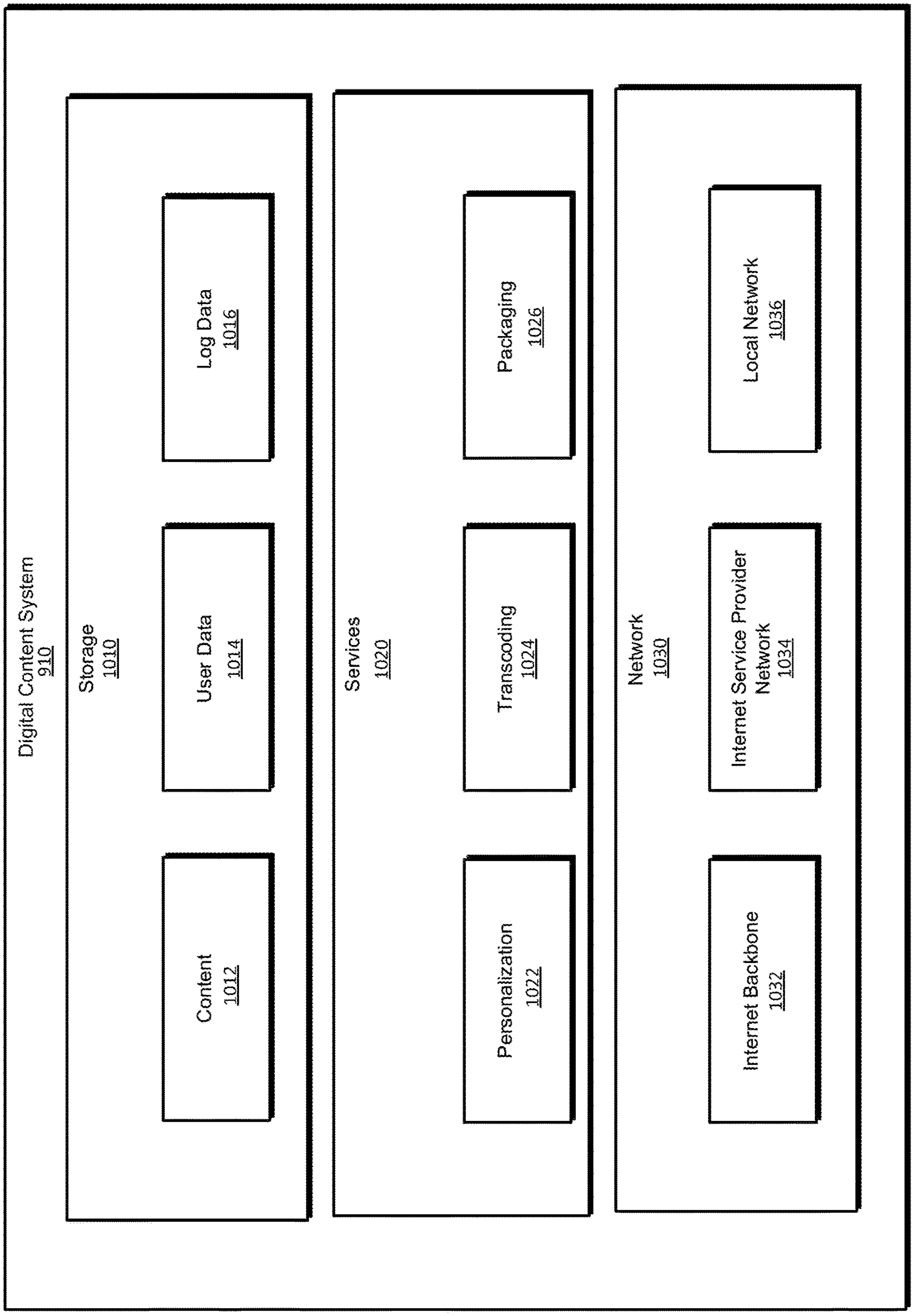
FIG. 10 illustrates a block diagram of an exemplary distribution infrastructure within the content distribution ecosystem shown in FIG. 9.
Figure 11:
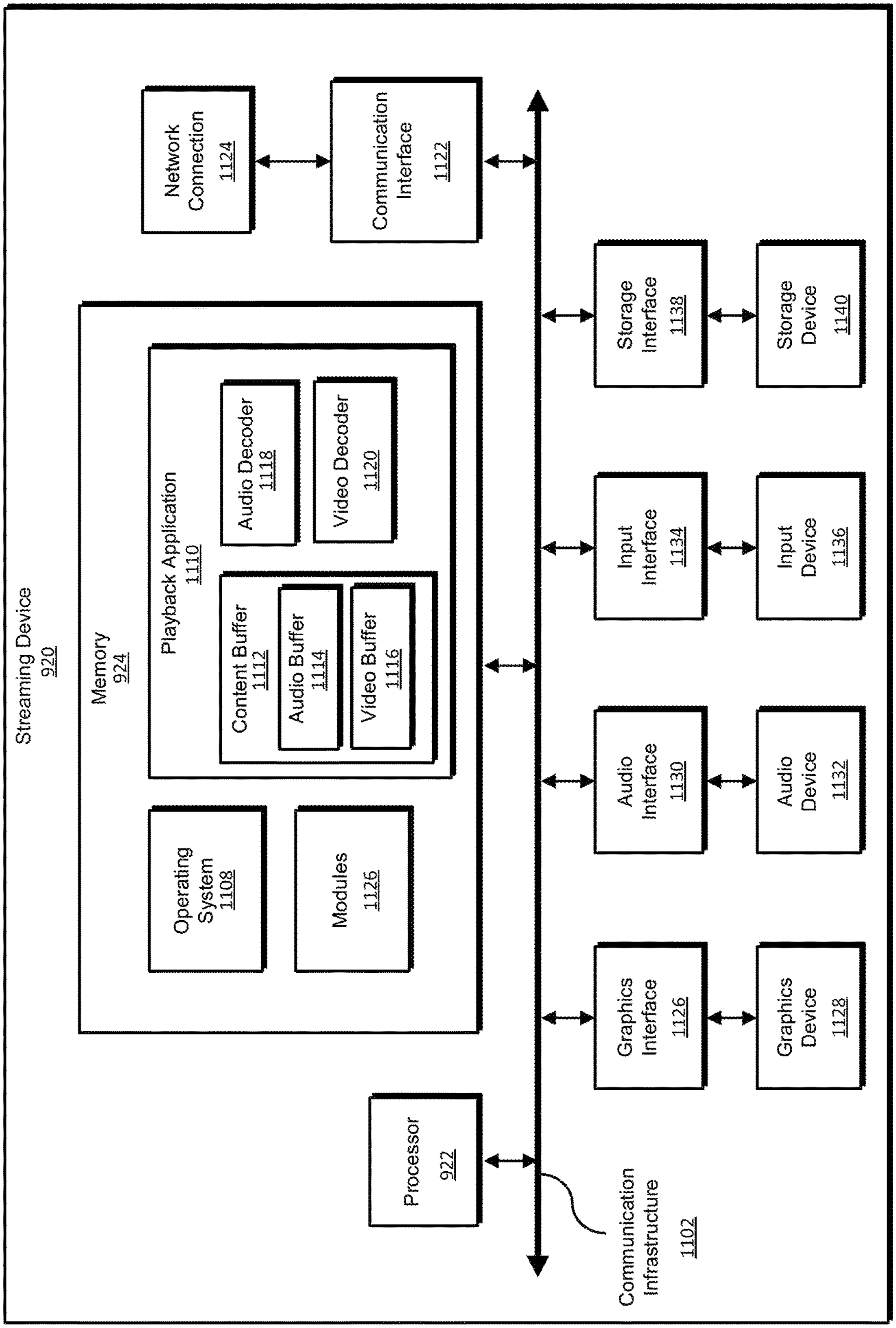
FIG. 11 illustrates a block diagram of an exemplary content player within the content distribution ecosystem shown in FIG. 10.

The following will provide, with reference to FIGS. 1-11, detailed descriptions of a dynamic control system that enables viewer interactions with a media item via a first screen device and a second screen device. For example, FIG. 1 illustrates an exemplary environment for implementing the inventive system described herein. Additionally, FIG. 2 illustrates an exemplary method for dynamically modifying components of a playback control graphical user interface based on media item context. FIGS. 3A-6C illustrate graphical user interfaces generated by the dynamic control system between a first screen device and second screen device while browsing, selecting, and playing media items. FIGS. 7A and 7B illustrate steps taken by the dynamic control system while pairing a first screen device and a second screen device. FIG. 8 illustrates additional detail with regard to the features and functionality of the dynamic control system. FIGS. 9, 10, and 11 illustrate exemplary ecosystems and infrastructures that can be used in connection with the dynamic control system.

As just mentioned, FIG. 1 illustrates an exemplary networking environment 100 implementing aspects of the present disclosure. For example, the networking environment 100 includes at least a server(s) 112, a first screen device 114, a second screen device 124, and a network 126. As further shown, the server(s) 112 includes a memory 106, additional items 108, and a physical processor 110. Similarly, the first screen device 114 and the second screen device 124 include memories 116*a*, 116*b*, additional items 120*a*, 120*b*, and physical processors 122*a*, 122*b*.

In one or more implementations, as shown in FIG. 1, the first screen device 114 and the second screen device 124 are computing devices including displays. To illustrate, in one example, the first screen device 114 is a television (e.g., a smart television with network capabilities) and the second screen device 124 is a smartphone (e.g., with a touch screen display). In most implementations, the first screen device 114 and the second screen device 124 include digital content system applications 118*a*, 118*b* corresponding to a digital content system 104 on the server(s) 112. As such, a user can interact with media items hosted by the digital content system 104 (e.g., by browsing, selecting, playing back) via either the first screen device 114, the second screen device 124, or both.

As further shown in FIG. 1, a dynamic control system 102 is implemented as part of the digital content system 104 within the memory 106 on the server(s) 112. In one or more implementations, the digital content system 104 includes a streaming service for providing digital media items to viewers. Additionally, in most examples, the dynamic control system 102 (alone or in combination with the digital content system 104) pairs the first screen device 114 and the second screen device 124. Furthermore, in most examples, the dynamic control system 102 further facilitates electronic messaging between the first screen device 114 and the second screen device 124. Moreover, in most examples, the dynamic control system 102 generates instructions for dynamically updating one or more graphical user interfaces on one or both of the first screen device 114 and the second screen device 124 based on a context or contextual changes associated with a media item. As such, the dynamic control system 102 generates graphical user interfaces or causes one or both of the first screen device 114 and the second screen device 124 to generate graphical user interfaces. When the dynamic control system 102 is discussed herein as generating graphical user interfaces, it will be understood that the dynamic control system 102 is generating and transmitting instructions that cause or trigger one or both of the first screen device 114 and the second screen device 124 to generate, modify, or render graphical user interfaces.

In some implementations, as mentioned above, the digital content system application 118*a*, 118*b* is installed on the first screen device 114 and/or the second screen device 124. For example, in one implementation, the first screen device 114 and the second screen device 124 generate and transmit electronic messages via the digital content system applications 118*a*, 118*b*, respectively. Moreover, in at least one implementation, the first screen device 114 and the second screen device 124 receive electronic transmissions from the dynamic control system 102 via the digital content system applications 118*a*, 118*b*, respectively.

As mentioned above, the first screen device 114 and/or the second screen device 124 may be communicatively coupled with the server(s) 112 through the network 126. In one or more implementations, the network 126 may represent any type or form of communication network, such as the Internet, and may include one or more physical connections, such as a LAN, and/or wireless connections, such as a WAN. In some implementations, the network 126 may represent a telecommunications carrier network. In at least one implementation, the network 126 may represent combinations of networks such that the first screen device 114 communicates with the digital content system 104 via a first network while the second screen device 124 communicates with the dynamic control system 102 via a second network.

Although FIG. 1 illustrates components of the exemplary networking environment 100 in one arrangement, other arrangements are possible. For example, in one implementation, the dynamic control system 102 operates as a native application that is installed on the first screen device 114 and the second screen device 124. In another implementation, the dynamic control system 102 operates across multiple servers. In at least one implementation, some features of the dynamic control system 102 exist solely on the first screen device 114 and/or the second screen device 124 while other features of the dynamic control system 102 exist as part of the digital content system 104 on the server(s) 112.

As mentioned above, FIG. 2 is a flow diagram of an exemplary computer implemented method 200 for dynamically updating a playback control graphical user interface based on a context or context change associated with a media item. The steps shown in FIG. 2 may be performed by any suitable computer-executable code and/or computing system, including the system(s) illustrated in FIG. 8. In one example, each of the steps shown in FIG. 2 may represent an algorithm whose structure includes and/or is represented by multiple sub steps, examples of which will be provided in greater detail below. The steps shown in FIG. 2 may occur in a different order than what is shown. For example, two steps shown in succession may be executed substantially concurrently, or the steps may be executed in the reverse order, etc.

As illustrated in FIG. 2, at step 202 the dynamic control system 102 pairs a first screen device (e.g., the first screen device 114) displaying a media item and a second screen device (e.g., second screen device 124) acting as a controller relative to the media item. In one example, the dynamic control system 102 pairs the first screen device 114 and the second screen device 124 by adding both devices to a device subscription list, and then providing the device subscription list back to one or both devices-thereby associating both devices. Once the first screen device 114 and the second screen device 124 are paired, the dynamic control system 102 on the 112 pushes electronic messages back and forth between the devices.

As further illustrated in FIG. 2, at step 204 the dynamic control system 102 determines a context associated with the media item. In one example, the dynamic control system 102 determines a context of a media item by determining that playback of the media item has been initiated, determining that playback of the media item has entered an introduction portion of the media item, determining that the media item is a last episode in a collection of episodes, and/or determining that a subtitle selection associated with the media item has been made. In some examples, the dynamic control system 102 further determines a context of the media item by determining whether the media item is a standalone media item (e.g., a movie) or an episodic media item (e.g., an episode of a TV show).

Moreover, at step 206 the dynamic control system 102 generates, based on the context, instructions to modify one or more components of a playback control graphical user interface displayed by the second screen device. In one example, the dynamic control system 102 generates the instructions to modify the one or more components of the playback graphical user interface by generating instructions to provide a new component within the playback control graphical user interface, highlight an existing component within the playback control graphical user interface, modify an existing component within the playback control graphical user interface, and/or update a position of a playback scrubber within the playback control graphical user interface.

Additionally, as shown in FIG. 2, at step 208 the dynamic control system 102 transmits the instructions to the second screen device to trigger the modification of the one or more components of the control graphical user interface. In one example, the dynamic control system 102 (e.g., operating as part of the digital content system application 118*b* on the second screen device 124) generates or updates the control graphical user interface to include additional, fewer, or modified components depending on a playback position of the media item, a type of the media item, a subtitle configuration of the media item, and so forth.

In one or more implementations, and as will be explained in greater detail below, the methods and steps performed by the dynamic control system 102 reference multiple terms. For example, as used herein, a "screen device" refers to a computing device that has a display. In some implementations, the screen device is interactive (e.g., such as a touch screen display). In some implementations, the screen device is associated with a remote control (e.g., such as with a television). In most examples, a screen device includes network capabilities such that it can connect to the dynamic control system 102 over the network 126.

As used herein, a "media item" refers to a digital audio and/or visual information that plays on a screen device. In some examples, a media item is a standalone media item such as a special or a movie. In some examples, a media item is an episodic media item such as a portion of a TV show that is part of a season.

As used herein, a "controller" refers to a device that acts as an intermediary between a viewer and a display device. In one example, a controller includes interactive components that enable a viewer to initiate playback of a media item on a display device, control the volume of the display device, navigate through menu options displayed on the display device, and so forth.

As used herein, "context" refers to a current circumstance, posture, or setting associated with a media item. In one or more examples, a media item's context includes its type, its playback status, one or more setting configurations associated with the media item, etc. Additionally, as used herein, "instructions" refer to an electronic message or encoding that informs one or more members of the exemplary networking environment 100 of a change. In one example, instructions refer to an electronic message originating from the second screen device 124 informing the first screen device 114 that a particular component of the playback control graphical user interface has been selected. In another example, instructions refer to an electronic encoding generated by the dynamic control system 102 (e.g., operating on the second screen device 124) that triggers the second screen device 124 to modify the playback control graphical user interface in response to receiving playback position information from the first screen device 114.

As mentioned above, the dynamic control system 102 pairs the first screen device 114 and the second screen device 124 and facilitates communications between the first screen device 114 and the second screen device 124. In many examples, the dynamic control system 102 further determines a context or context changes relative to media items and generates instructions that cause one or more of the first screen device 114 and the second screen device 124 to trigger user interface modifications based on those context changes. FIGS. 3A-6C illustrate user interface modifications triggered by the dynamic control system 102 while pairing the first screen device 114 and the second screen device 124 and in response to context changes determined while media items are browsed, selected, and played.

Figure 3B:
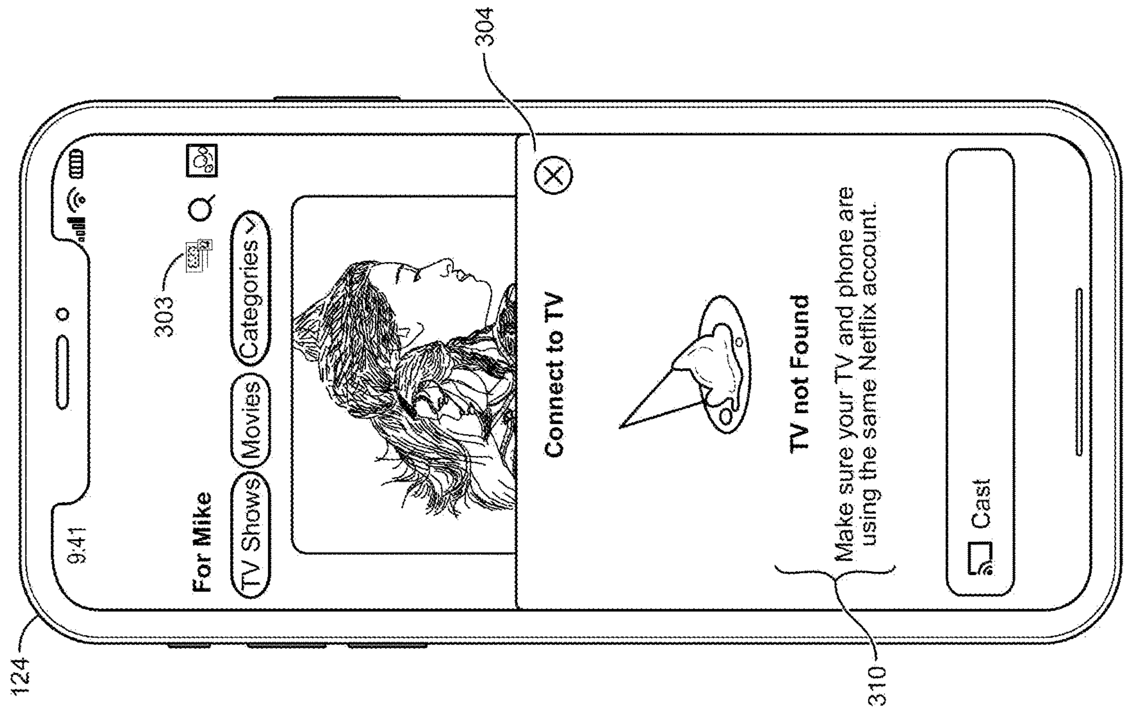
FIGS. 3A-3F illustrate graphical user interfaces generated by the dynamic control system during pairing in accordance with one or more implementations.
Figure 3A:
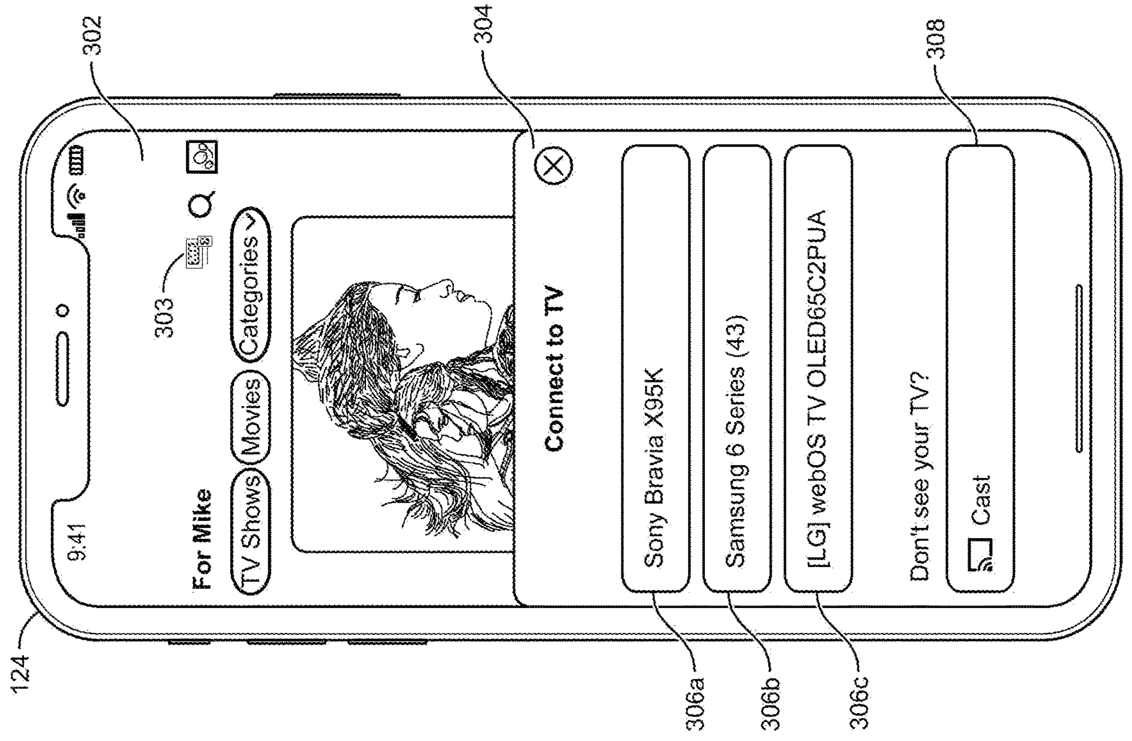

In more detail, FIGS. 3A-3F illustrate user interfaces including modifications triggered by the dynamic control system 102 during the process of pairing the first screen device 114 and the second screen device 124. In one example, as shown in FIG. 3A, the dynamic control system 102 detects one or more additional screen devices (e.g., such as the first screen device 114) and causes the second screen device 124 to overlay a pairing option list user interface 304 on a digital content system menu interface 302 within the digital content system application 118*b* on the second screen device 124.

In at least one implementation, the dynamic control system 102 overlays the pairing option list user interface 304 in response to a detected selection of a pairing control 303. In the example described throughout FIGS. 3A-5A, the dynamic control system 102 modifies the pairing control 303 on the digital content system menu interface 302 to reflect a pairing state or status of the second screen device 124. To illustrate, the dynamic control system 102 displays the pairing control 303 with a first appearance (e.g., a first color, a first line weight, a first line pattern) while the second screen device 124 is unpaired. In response to pairing the second screen device 124 with another screen device (or in response to the second screen device 124 being mid-way through the pairing process), the dynamic control system 102 updates the appearance of the pairing control 303 to reflect this state change.

As shown in FIG. 3A, the pairing option list user interface 304 includes pairing options 306*a*, 306*b*, and 306*c*. In at least one implementation, each of the pairing options 306*a*-306*c* correspond to additional screen devices discovered in connection with the same digital content system account. In response to a detected selection of one of the pairing options 306*a*-306*c*, the dynamic control system 102 pairs the second screen device 124 with the corresponding screen device (e.g., such as the first screen device 114). In response to a detected selection of a cast option 308, the dynamic control system 102 can attempt to connect the second screen device 124 with one or more of the listed display devices via an additional third-party protocol.

As shown in FIG. 3B, and in response to a detected selection of one of the pairing options 306*a*-306*c*, the dynamic control system 102 provides a pairing indication 310 associated with the pairing process involving the second screen device 124 and the screen device corresponding to the selected pairing option. In the example shown in FIG. 3B, the dynamic control system 102 generates the pairing indication 310 within the pairing option list user interface 304 to inform the user of the second screen device 124 that the selected screen device was not found.

In response to a successful pairing (e.g., following a detected selection of the pairing option 306a as shown in FIG. 3A), the dynamic control system 102 again updates the display of the second screen device 124. For example, as shown in FIG. 3C, the dynamic control system 102 generates and displays a playback control graphical user interface 404 on the second screen device 124. As will be discussed in greater detail below with regard to FIG. 4B, the dynamic control system 102 generates the playback control graphical user interface 404 including various controls and buttons that enable the user of the second screen device 124 to control playback of a media item, browse additional media items, search for a specific media item, and more.

Figure 3D:
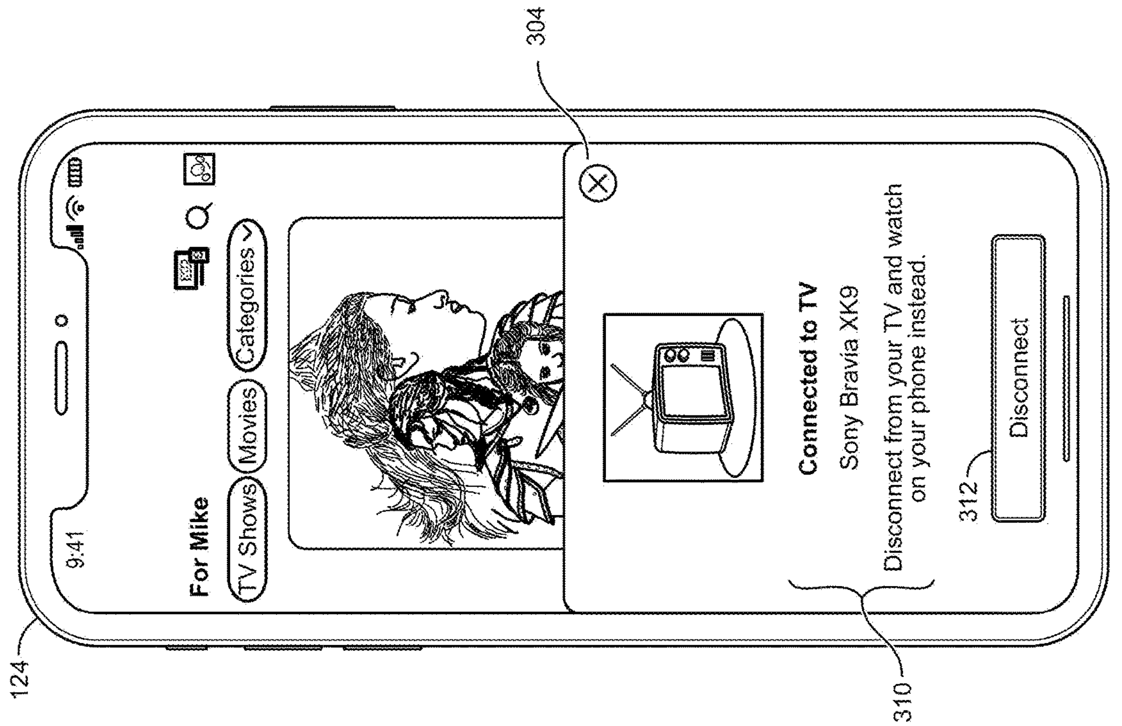
Figure 3C:
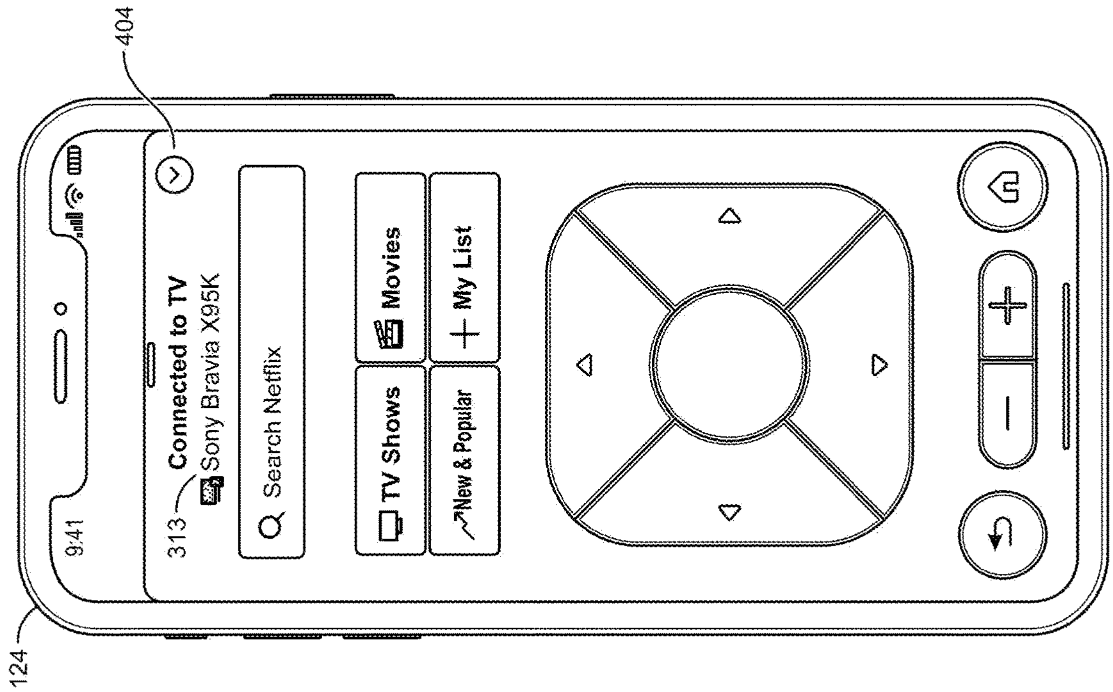

In some implementations, as shown in FIG. 3D, the dynamic control system 102 provides a disconnect option once the second screen device 124 is paired with a first screen device. For example, as shown in FIG. 3D, the dynamic control system 102 generates the pairing indication 310 within the pairing option list user interface 304. In some implementations, the dynamic control system 102 provides the pairing option list user interface 304 in response to a detected selection of a first screen device indicator 313 (e.g., "Sony Bravia X95K") as shown in FIG. 3C. As further shown in the example shown in FIG. 3D, the dynamic control system 102 generates the pairing option list user interface 304 including instructions on how to disconnect. In response to a detected selection of a disconnect button 312 shown in FIG. 3D, the dynamic control system 102 unpairs or disconnects the second screen device 124 from the selected first screen device (e.g., the first screen device 114).

Figure 3E:
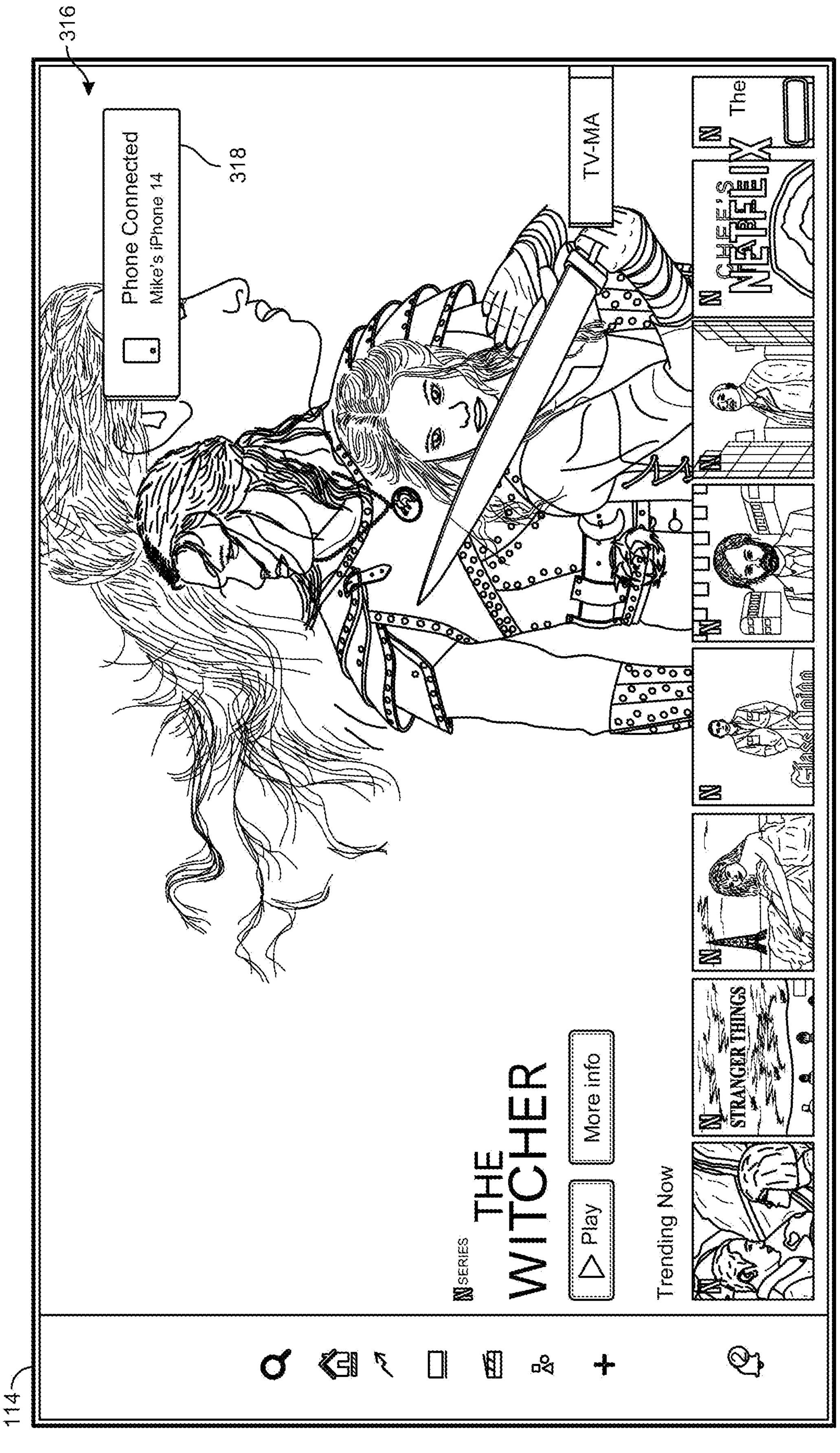
Figure 3F:
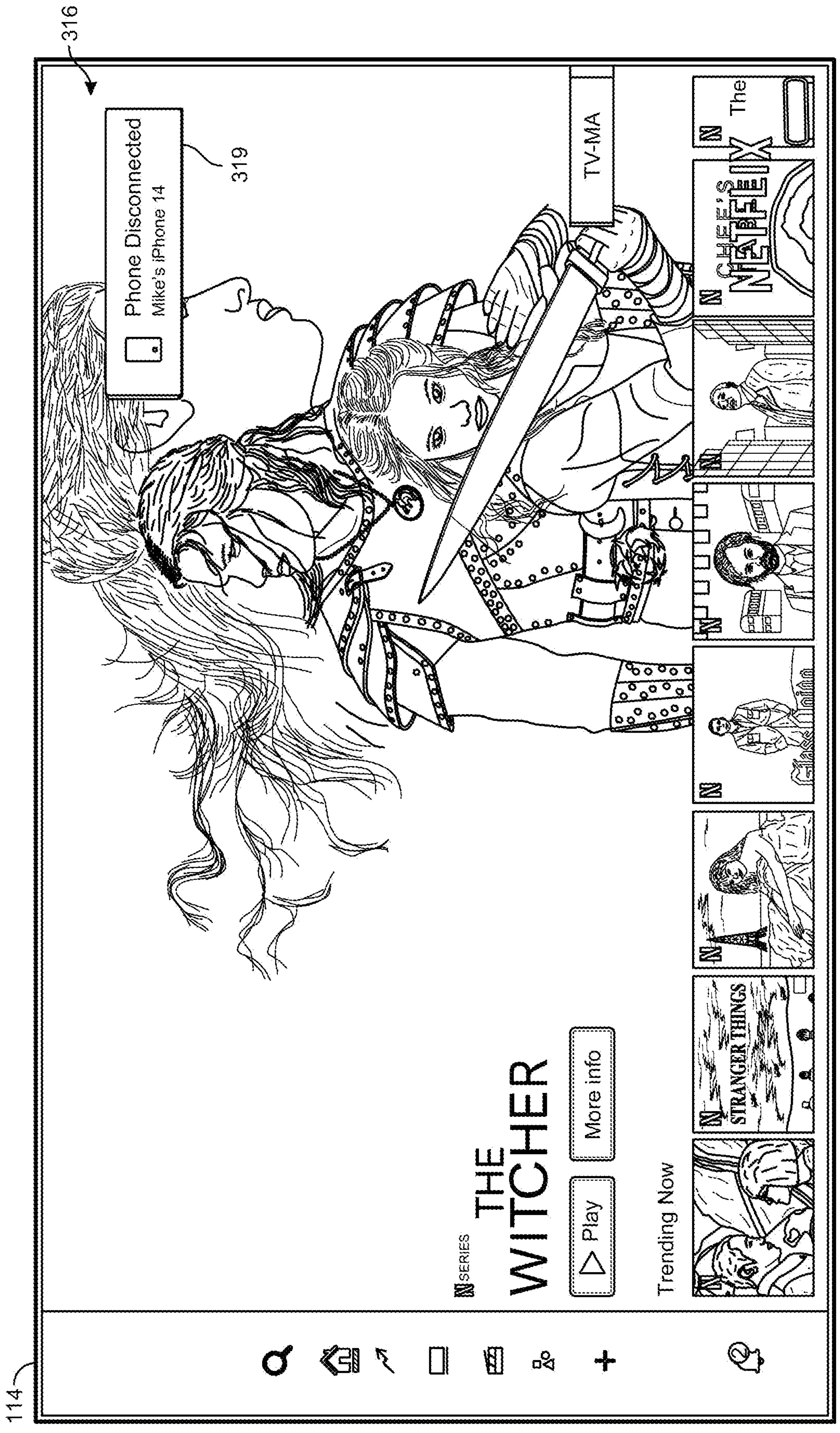

In one or more implementations, the dynamic control system 102 also generates updates for one or more user interfaces on the selected screen device (e.g., the first screen device 114) during the pairing process. For example, as shown in FIG. 3E and in response to successfully pairing the first screen device 114 and the second screen device 124, the dynamic control system 102 overlays a successful pairing indication 318 on a media item graphical user interface 316 on the first screen device 114. Similarly, as shown in FIG. 3F and in response to successfully disconnecting the first screen device 114 from the second screen device 124, the dynamic control system 102 overlays a successful disconnection indication 319 on the media item graphical user interface 316 on the first screen device 114. In at least one implementation, the dynamic control system 102 generates the successful pairing indication 318 and the successful disconnection indication 319 including an indication of the second screen device 124 (e.g., "Mike's iPhone 14").

In one or more implementations, the dynamic control system 102 generates—or causes the second screen device 124 to generate—a playback control graphical user interface that enables a user of the second screen device 124 to control playback of a media item playing on the first screen device 114. FIGS. 4A-4I illustrate additional detail with regard to the playback control graphical user interface. For example, as shown in FIG. 4A and once the second screen device 124 is paired with the first screen device 114, the dynamic control system 102 overlays the remote control option 402 on the digital content system menu interface 302. For example, following pairing of the second screen device 124 and the first screen device 114, the dynamic control system 102 provides the remote control option 402 to enable the user of the second screen device 124 to browse media items, initiate playback of media items on the first screen device 114, control playback of media items on the first screen device 114 and more.

Figure 4B:
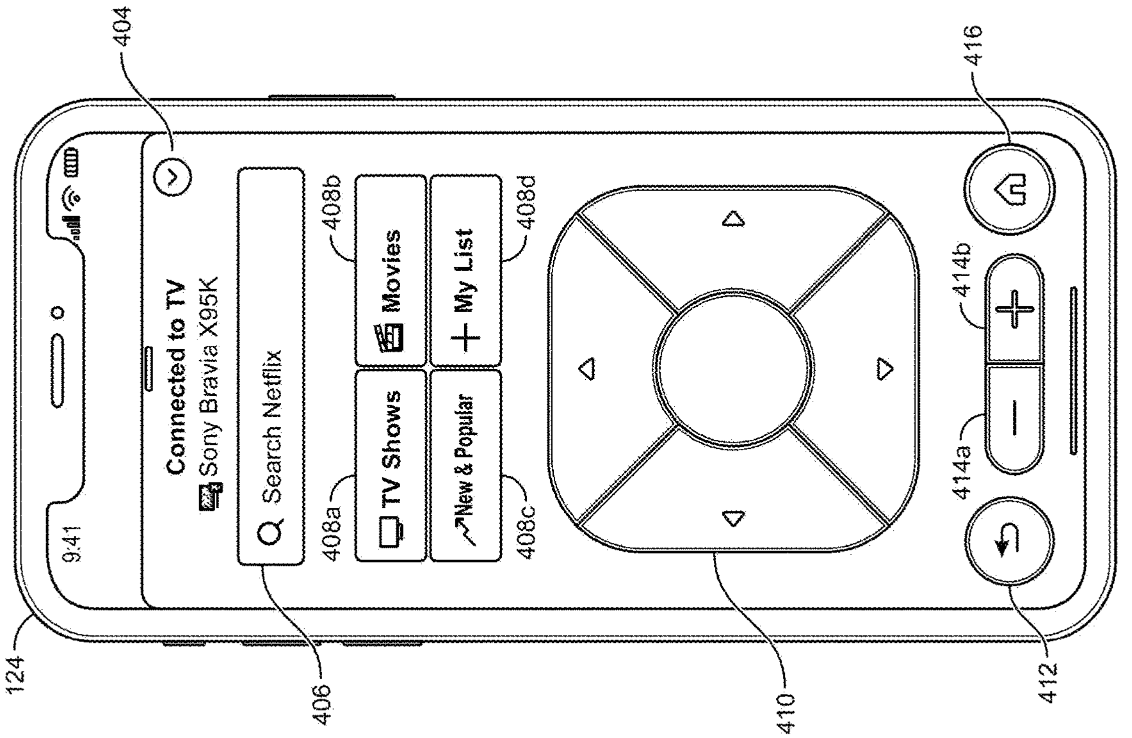
FIGS. 4A-4I illustrate graphical user interfaces generated by the dynamic control system during media item browsing in accordance with one or more implementations.
Figure 4A:
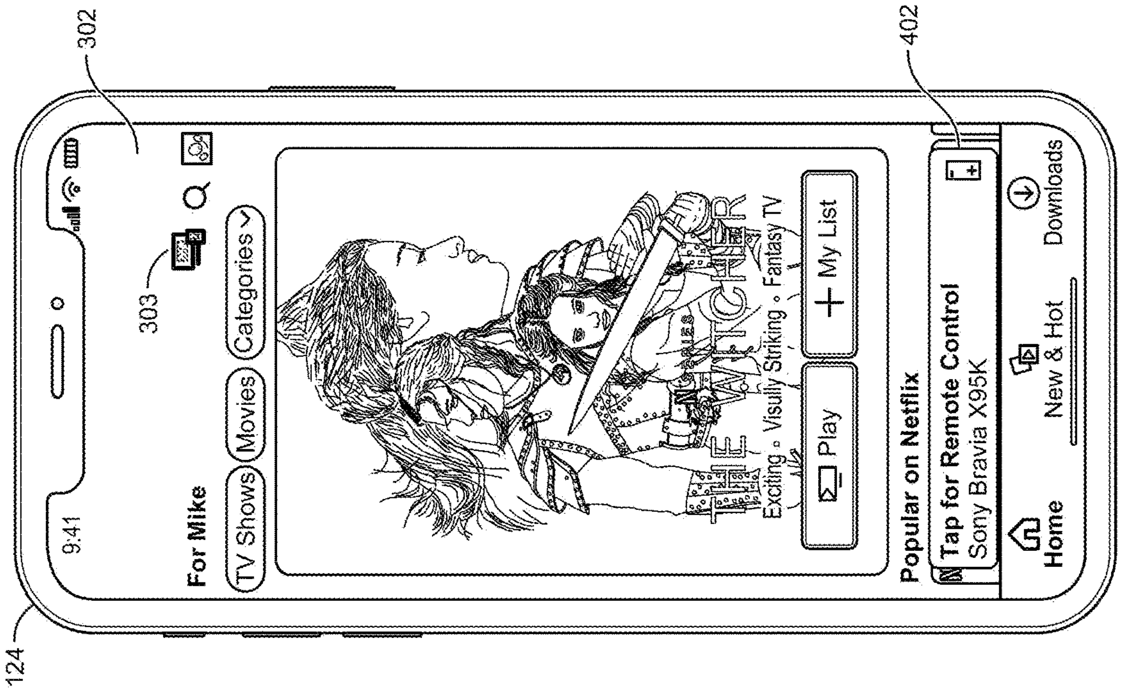

For example, as shown in FIG. 4B and in response to a detected selection of the remote control option 402, the dynamic control system 102 causes the second screen device 124 to generate the playback control graphical user interface 404. In one or more implementations, the playback control graphical user interface 404 includes a search box 406, media item options 408a, 408b, 408c, and 408d, a left-right-up-down (LRUD) control 410, a back button 412, volume buttons 414a, 414b, and a home button 416. In one or more implementations, the dynamic control system 102 enables a viewer to control playback of a media item with any of the components of the playback control graphical user interface 404 illustrated in FIG. 4B—even when the media item is displayed by the first screen device 114.

In an alternative example, the dynamic control system 102 causes the second screen device 124 to generate a playback control graphical user interface 404 in response to a detected selection of the pairing control 303 (e.g., shown in FIG. 4A). As mentioned above, the dynamic control system 102 indicates a current pairing status of the second screen device 124 with the appearance of the pairing control 303. In response to a detected selection of the pairing control 303, the dynamic control system 102 initiates the pairing protocol if the second screen device 124 is currently unpaired. In response to a detected selection of the pairing control 303 while the second screen device 124 is paired, the dynamic control system 102 provides the playback control graphical user interface 404.

In more detail, the components of the playback control graphical user interface 404 enable the viewer to interact with the media item and/or the digital content system 104 in different ways. For example, the dynamic control system 102 provides search capabilities in response to detected interaction with the search box 406. Moreover, the dynamic control system 102 provides list displays of additional media items in response to detected interactions with any of the media item options 408a-408d. Furthermore, the dynamic control system 102 enables interactions with digital content system 104 menus and options in response to detected selection of any of the portions of the LRUD control 410. The dynamic control system 102 also enables navigations through the digital content system application 118b on the second screen device 124 in response to detected selections of the back button 412 and/or home button 416. Additionally, the dynamic control system 102 enables volume control on the first screen device 114 in response to detected interactions with either of the volume buttons 414a, 414b.

Figure 4C:
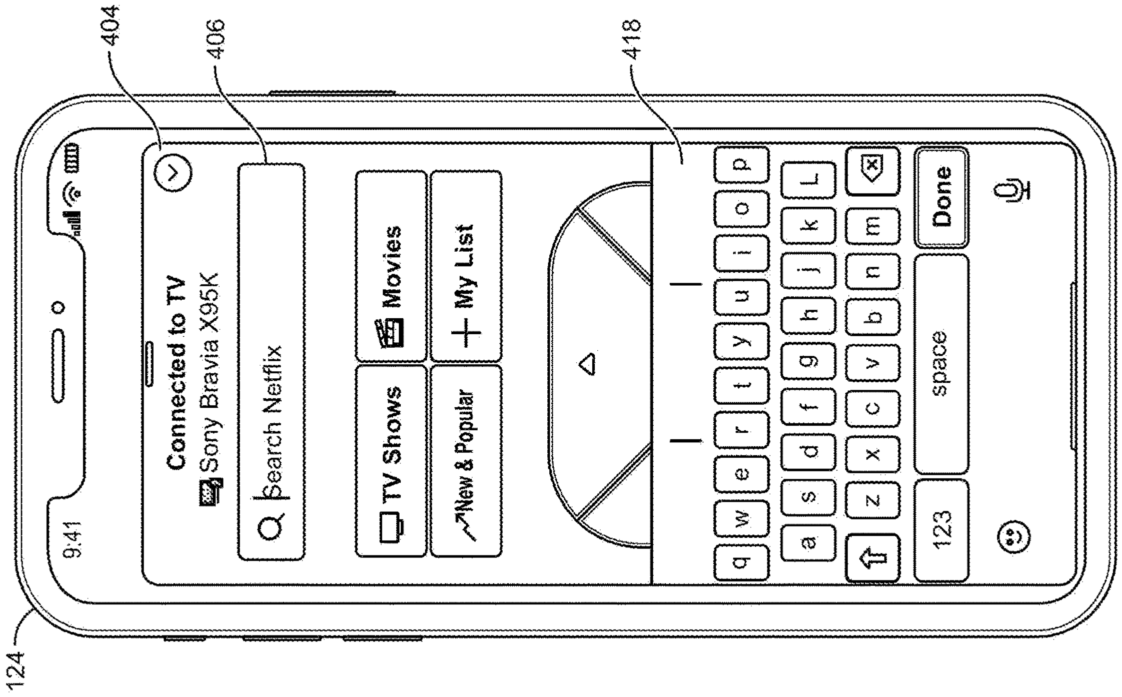
Figure 4D:
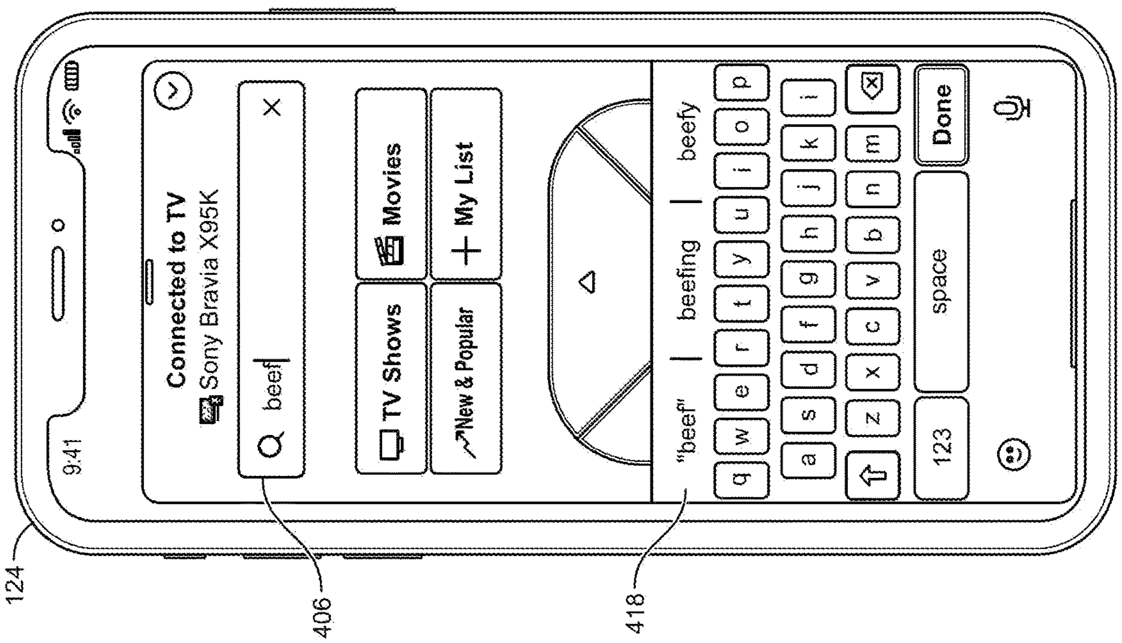

In further detail, as shown in FIGS. 4C and 4D, the dynamic control system 102 provides search capabilities via the search box 406. For example, in response to a detected selection of the search box 406, the dynamic control system 102 overlays a touch screen keyboard 418 on the playback control graphical user interface 404. By selecting keys in the touch screen keyboard 418, the user of the second screen device 124 inputs a search term into the search box 406. The dynamic control system 102 then initiates a search within the digital content system 104 based on the search term.

Figure 4E:
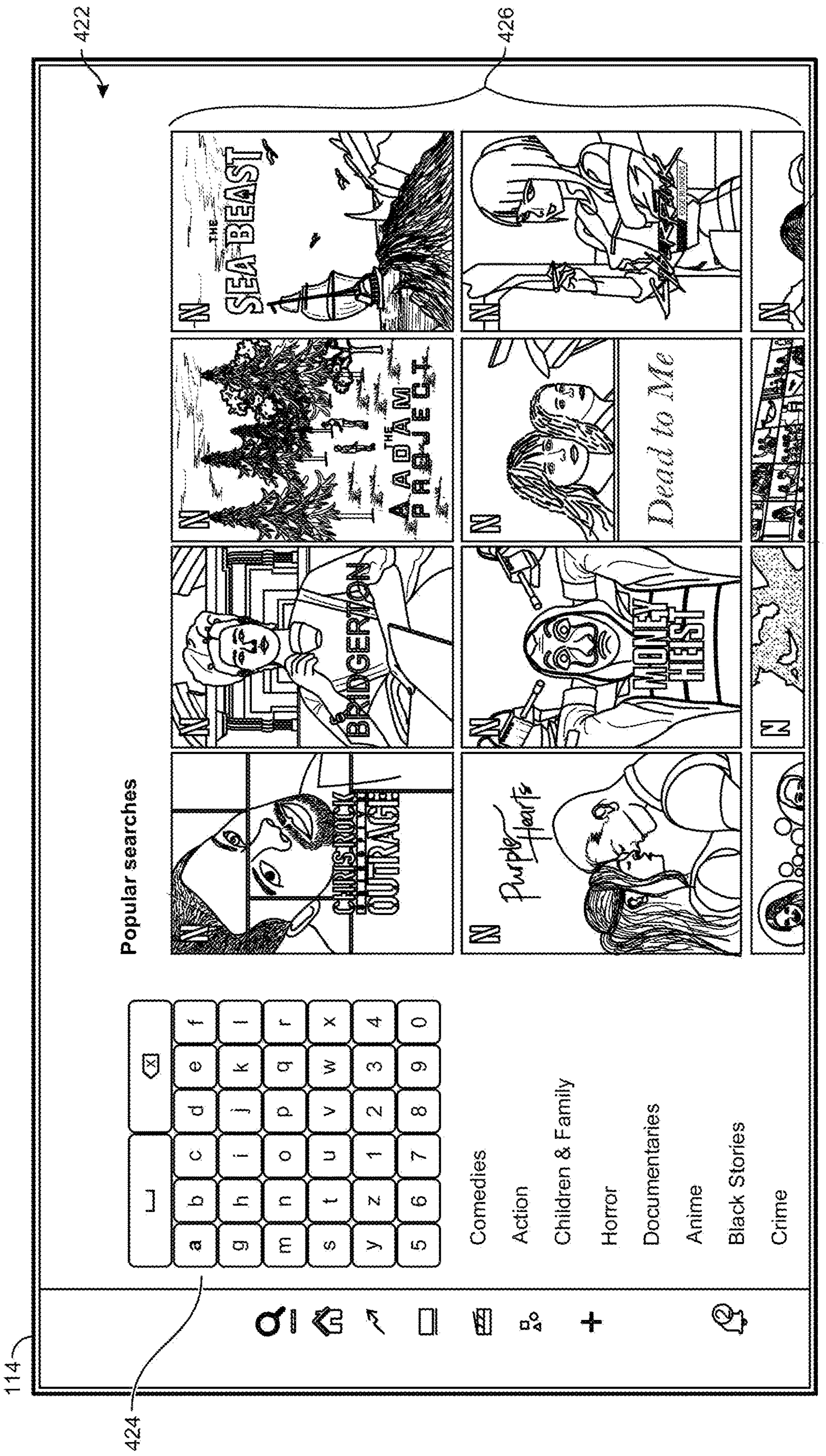
Figure 4F:
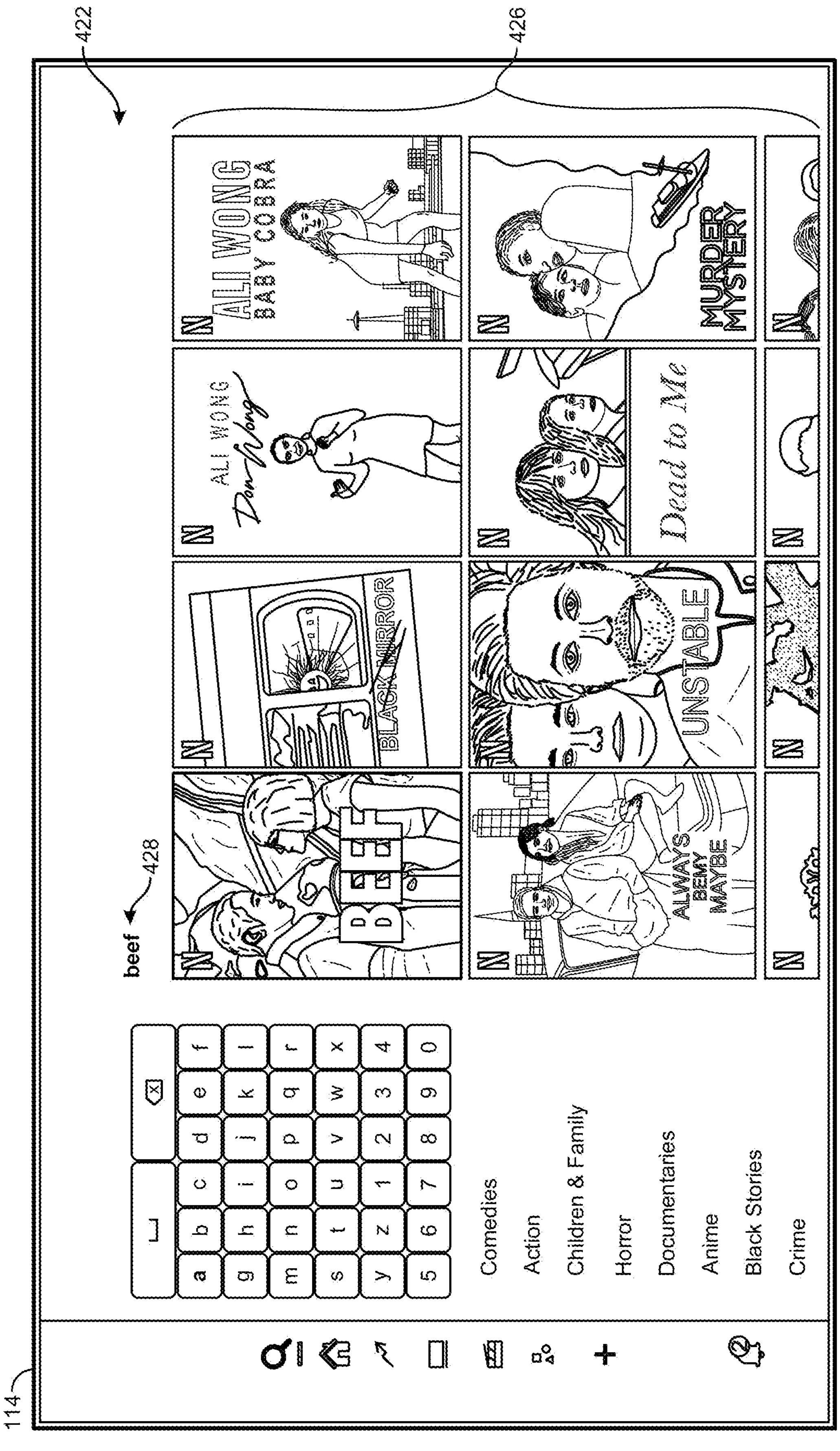

In one or more examples, as shown in FIG. 4E, the dynamic control system 102 coordinates the search initiated on the second screen device 124 with one or more search displays shown on the first screen device 114. In more detail, in one example, the dynamic control system 102 causes the first screen device 114 to generate and/or display a search graphical user interface 422. In that example, as the viewer types a search term into the search box 406 on the second screen device 124, the dynamic control system 102 adds a mirroring search term 428 on the first screen device 114 within the search graphical user interface 422 (as shown in FIG. 4F). The dynamic control system 102 further updates a search result listing 426 with media item results of the search.

In an alternative example, the dynamic control system 102 enables the viewer to interact with an on-screen keyboard 424 on the first screen device 114 by manipulating one or more components of the playback control graphical user interface 404 on the second screen device 124. For example, in response to detected selections of the LRUD control 410 on the second screen device 124, the dynamic control system 102 can indicate key selections in the on-screen keyboard 424 on the first screen device 114 and can navigate among/select a media title from among the titles included in the search result listing 426. Thus, the dynamic control system 102 enables the viewer to input a search term 428 to identify a specific media item.

Figure 4G:
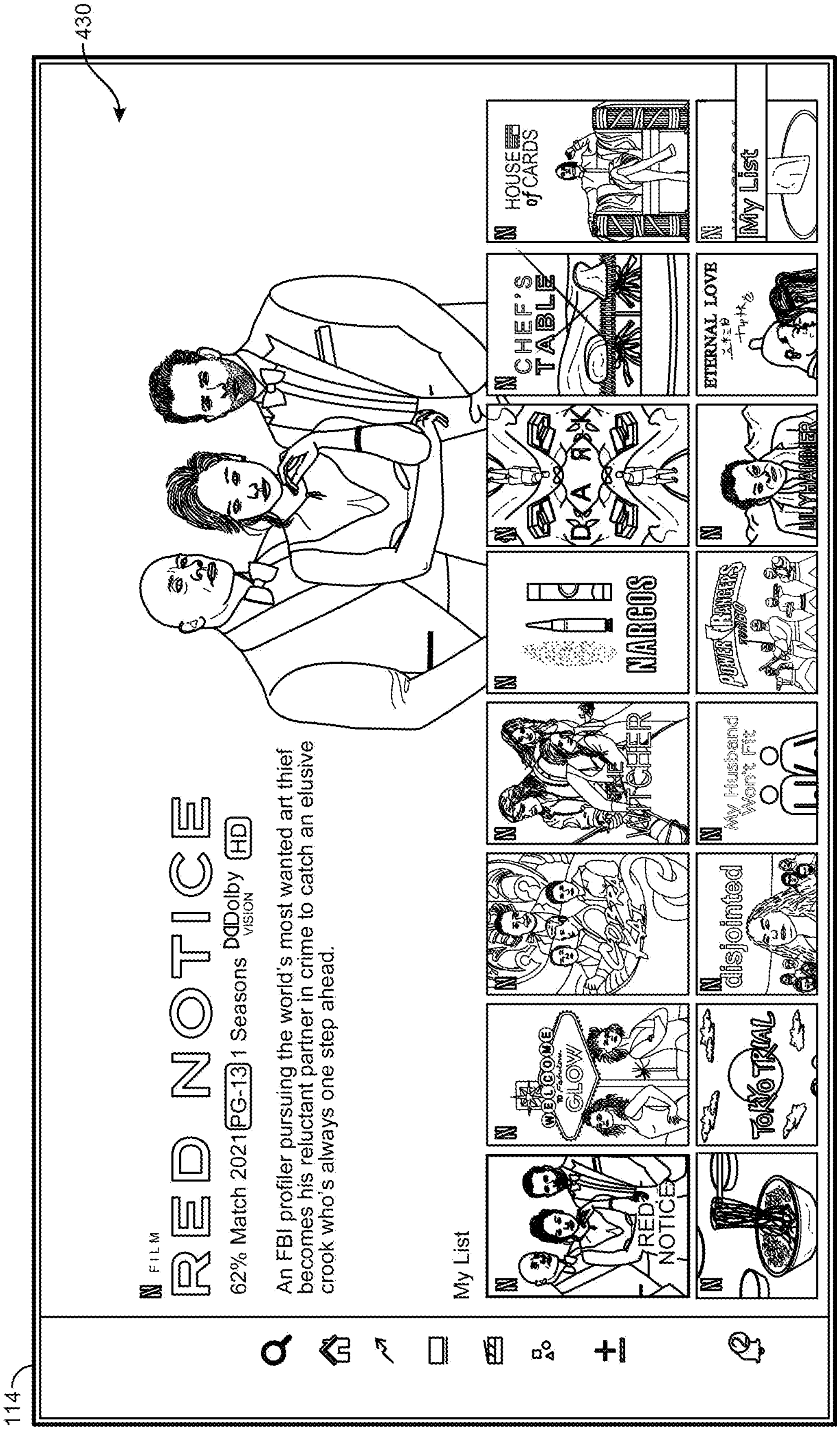

As further shown in FIG. 4G, in some implementations, the dynamic control system 102 causes the first screen device 114 to generate and or display a personalized user interface 430 in response to a detected selection of the media item option 408*d* (e.g., as shown in FIG. 4B). The dynamic control system 102 generates—or causes the first screen device 114 to generate—the personalized user interface 430 including a listing of media items previously selected by the viewer for inclusion in the viewer's "My List." In response to further detected selections of the LRUD control 410 (e.g., as shown in FIG. 4B) on the second screen device 124, the dynamic control system 102 enables interactions with and selections of media items within the personalized user interface 430 on the first screen device 114.

In some implementations, the dynamic control system 102 further disconnects the second screen device 124 from the first screen device 114 in response to additional user selections on the second screen device 124. For example, as shown in FIG. 4H, the dynamic control system 102 overlays the pairing option list user interface 304 (e.g., as discussed above with reference to FIG. 3C) on the playback control graphical user interface 404 in response to a detected selection of an indicator of the first screen device 114 (e.g., such as the indicator "Sony Bravia X95K" shown within the playback control graphical user interface 404 shown in FIG. 4B above). In that instance, the dynamic control system 102 removes the playback control graphical user interface 404—revealing the digital content system menu interface 302. The dynamic control system 102 then overlays the pairing option list user interface 304 including the disconnect button 312. From the pairing option list user interface 304, the dynamic control system 102 then enables the viewer to initiate the disconnection by selecting the disconnect button 312.

Figure 4I:
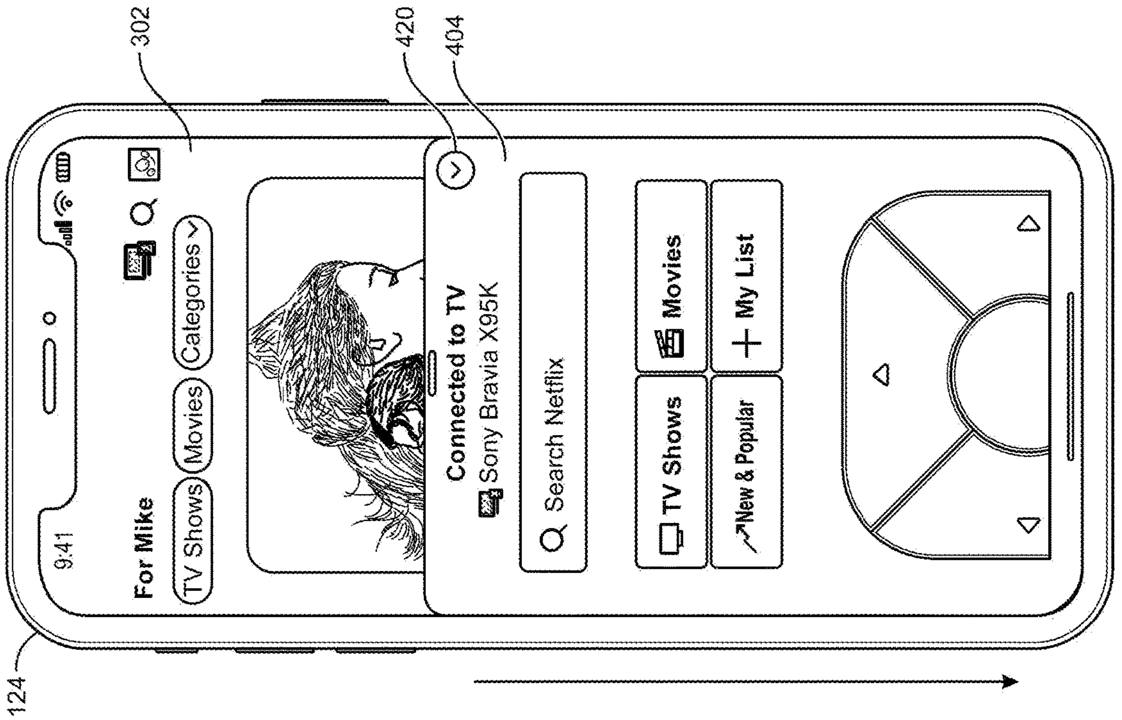
Figure 4H:
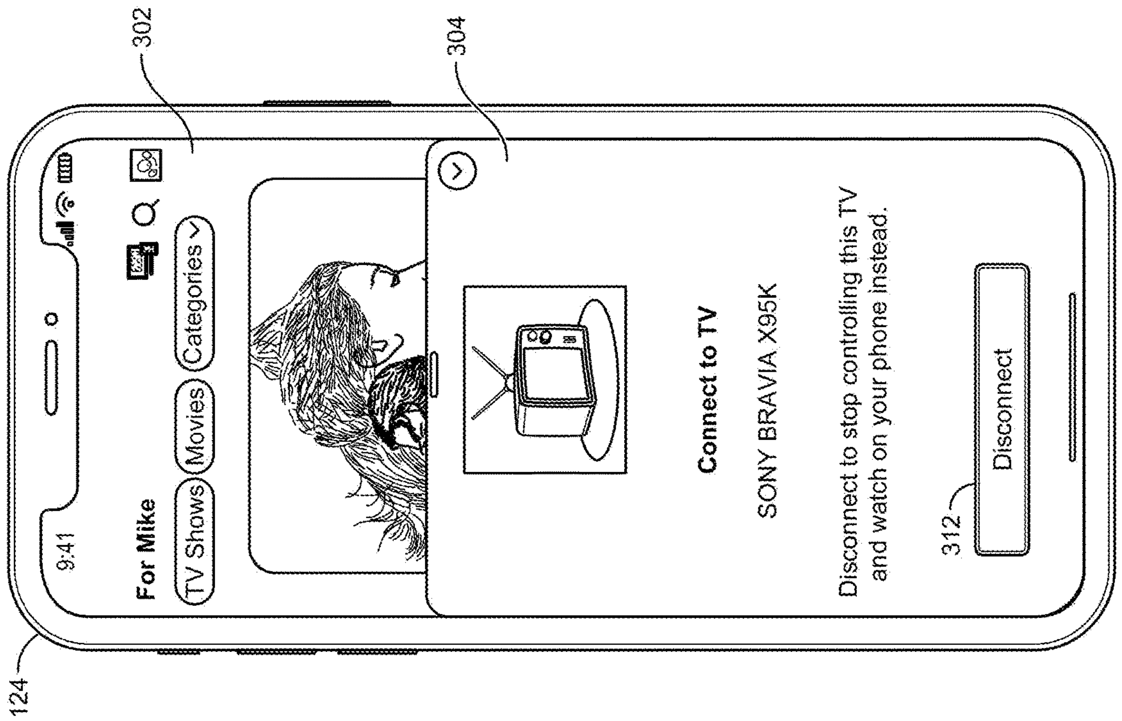

In one or more implementations, as shown in FIG. 4I, the dynamic control system 102 enables dismissal of the playback control graphical user interface 404 within the digital content system application 118*b* on the second screen device 124. In one example, the dynamic control system 102 removes the playback control graphical user interface 404 from the digital content system menu interface 302 in response to a detected selection of the dismiss button 420. In another example, the dynamic control system 102 removes the playback control graphical user interface 404 from the digital content system menu interface 302 in response to detecting a vertical swipe-down touch gesture on the touch screen of the second screen device 124 (e.g., along the direction indicated by the arrow in FIG. 4I.

Figure 5A:
FIGS. 5A-5L illustrate graphical user interfaces generated by the dynamic control system during media item playback in accordance with one or more implementations.

In some examples, as mentioned above, the dynamic control system 102 dynamically modifies the playback control graphical user interface 404 in response to determining a context or context change associated with a media item. FIGS. 5A-5K illustrate additional details with regard to this functionality. To illustrate, as shown in FIG. 5A, the dynamic control system 102 overlays a media item playback control 502 on the digital content system menu interface 302 on the second screen device 124 while a media item is playing on the first screen device 114 (e.g., assuming the second screen device 124 and the first screen device 114 are paired). In one implementation, the dynamic control system 102 enables simple playback controls (e.g., play/pause) directly from the media item playback control 502.

Figure 5B:
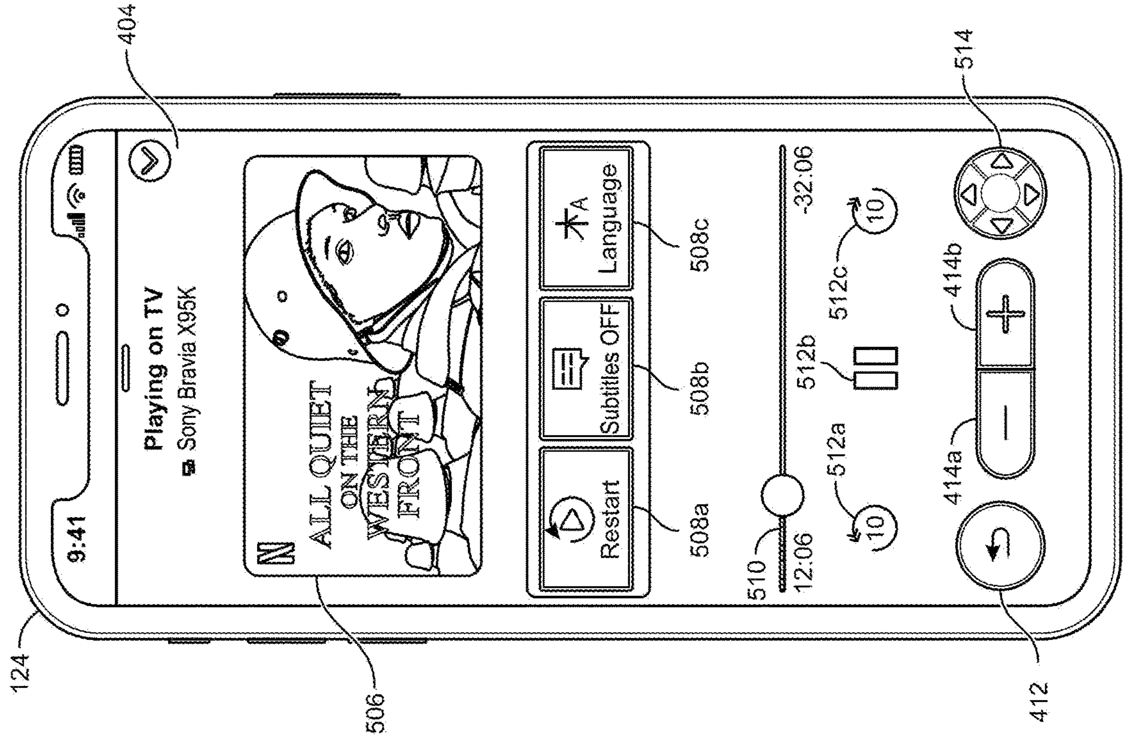

Additionally, as shown in FIG. 5B and in response to a detected selection of the media item playback control 502, the dynamic control system 102 overlays the playback control graphical user interface 404 on the touch screen display of the second screen device 124. As further shown in FIG. 5B, the dynamic control system 102 generates the playback control graphical user interface 404 including different or additional components during media item playback. For example, the dynamic control system 102 generates the playback control graphical user interface 404 including a media item indicator 506, playback options 508*a*, 508*b*, and 508*c*, a playback scrubber 510, a jump-back button 512*a*, a pause/play button 512*b*, a jump-forward button 512*c*, the back button 412, the volume buttons 414*a*-414*b*, and a LRUD control switch 514. In response to detected selections of the components of the playback control graphical user interface 404, the dynamic control system 102 restarts playback of the media item indicated by the media item indicator 506, changes subtitle and language settings, scrubs and jumps playback position backwards and forwards, and so forth.

Figure 5C:
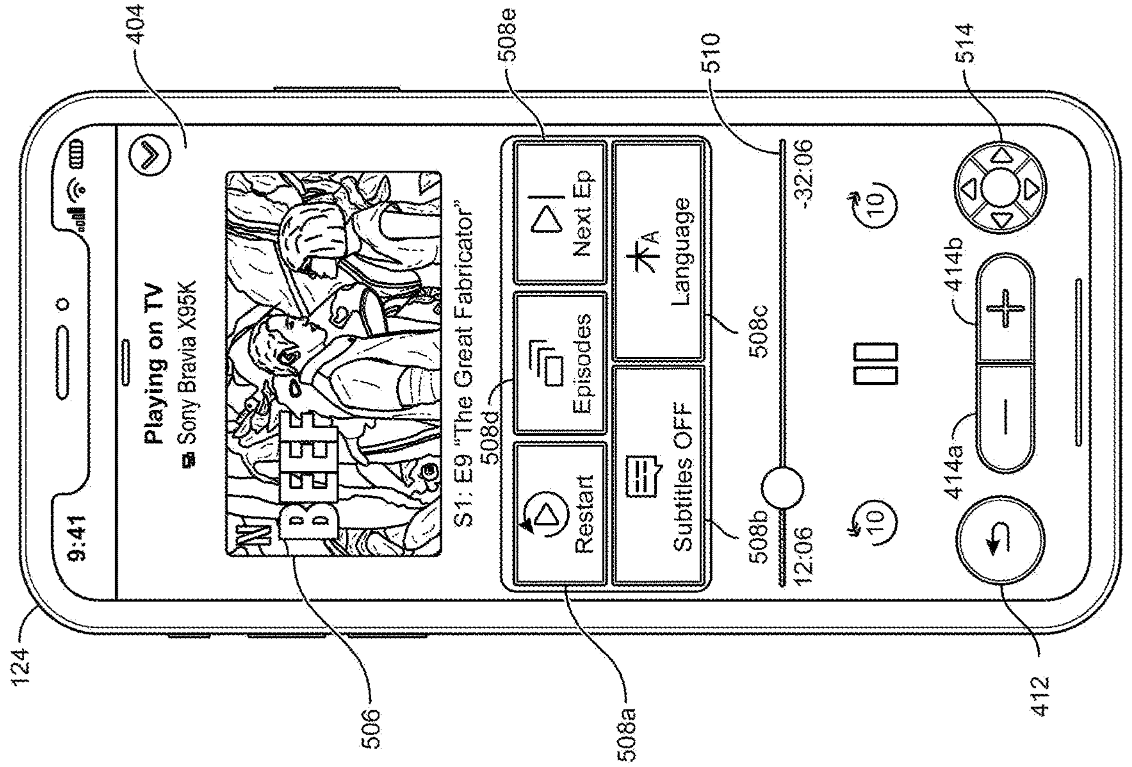

In one or more examples, the dynamic control system 102 dynamically modifies components of the playback control graphical user interface 404 based on context changes associated with a media item. To illustrate, in one example, as shown in FIGS. 5B and 5C, the dynamic control system 102 provides a selection of components within the playback control graphical user interface 404 based on a type associated with the current media item. For example, the dynamic control system 102 provides the selection of components shown in FIG. 5B in response to determining that the current media item is a movie.

In response to determining that the current media item is an episode, the dynamic control system 102 provides a different selection of components, as further shown in FIG. 5C. For example, the dynamic control system 102 provides components that are specific to episodic media items. To illustrate, as shown in FIG. 5C, the dynamic control system 102 provides components such as an episode option 508*d* (e.g., that enables a viewer to see a listing of episodes associated with the same show) and a next episode option 508*e* (e.g., that enables a viewer to skip to the next episode in the same show. The dynamic control system 102 further provides components that are common to all types of media items such as the media item indicator 506, the playback options 508*a*, 508*b*, and 508*c*, the playback scrubber 510, the back button 412, the volume buttons 414*a* and 414*b*, and the LRUD control switch 514.

Figure 5D:
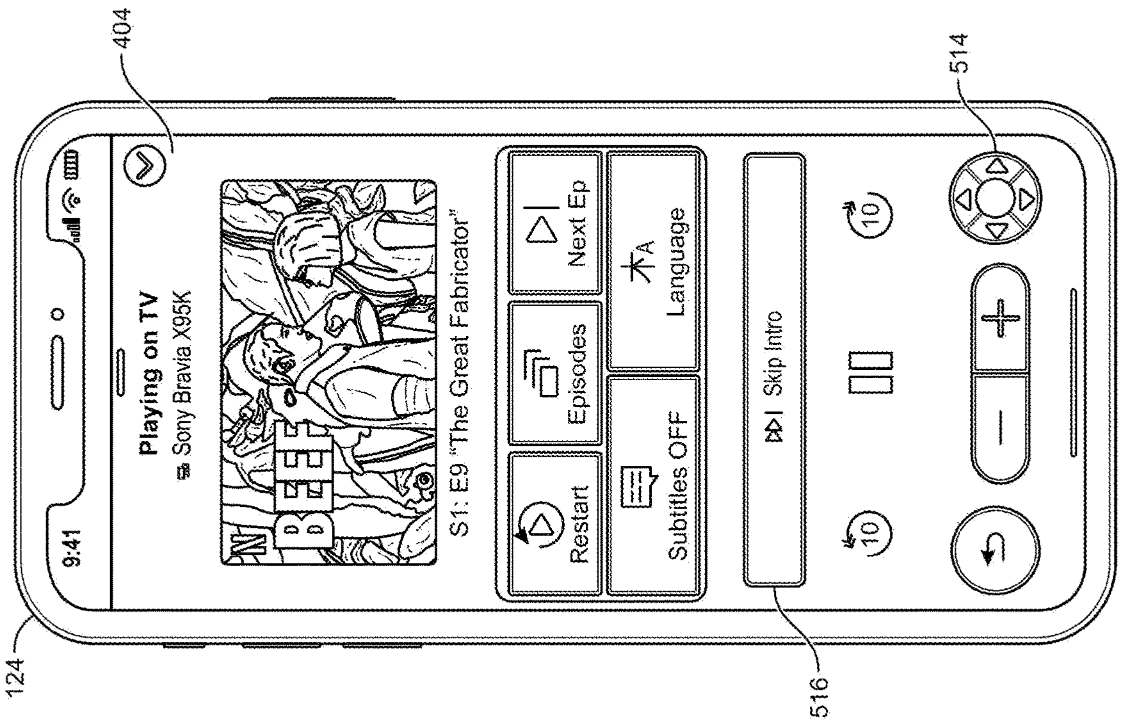

In additional examples, the dynamic control system 102 provides or modifies additional components of the playback control graphical user interface 404 based on a context or contextual changes associated with a media item. For example, as shown in FIG. 5D, the dynamic control system 102 determines a context associated with a media item based on the current playback position of the media item. To illustrate, the dynamic control system 102 determines a context change when the playback position of the media item indicates that an introductory portion of the media item has started playing (e.g., such as a "Previously On . . . " type portion of the media item). In response to determining or detecting such a context change, the dynamic control system 102 modifies the playback control graphical user interface 404 by adding a skip intro button 516 to the playback control graphical user interface 404. In one or more implementations, the dynamic control system 102 maintains the skip intro button 516 within the playback control graphical user interface 404 for a predetermined amount of time (e.g., ten seconds). Additionally or alternatively, the dynamic control system 102 maintains the skip intro button 516 within the playback control graphical user interface 404 until the current playback position moves past the introductory portion of the media item. At that point, the dynamic control system 102 determines that another context change has occurred in association with the media item (e.g., the playback position moving into an opening credits portion of the media item or a main portion of the media item) and modifies the playback control graphical user interface 404 again to remove the skip intro button 516.

Figure 5E:
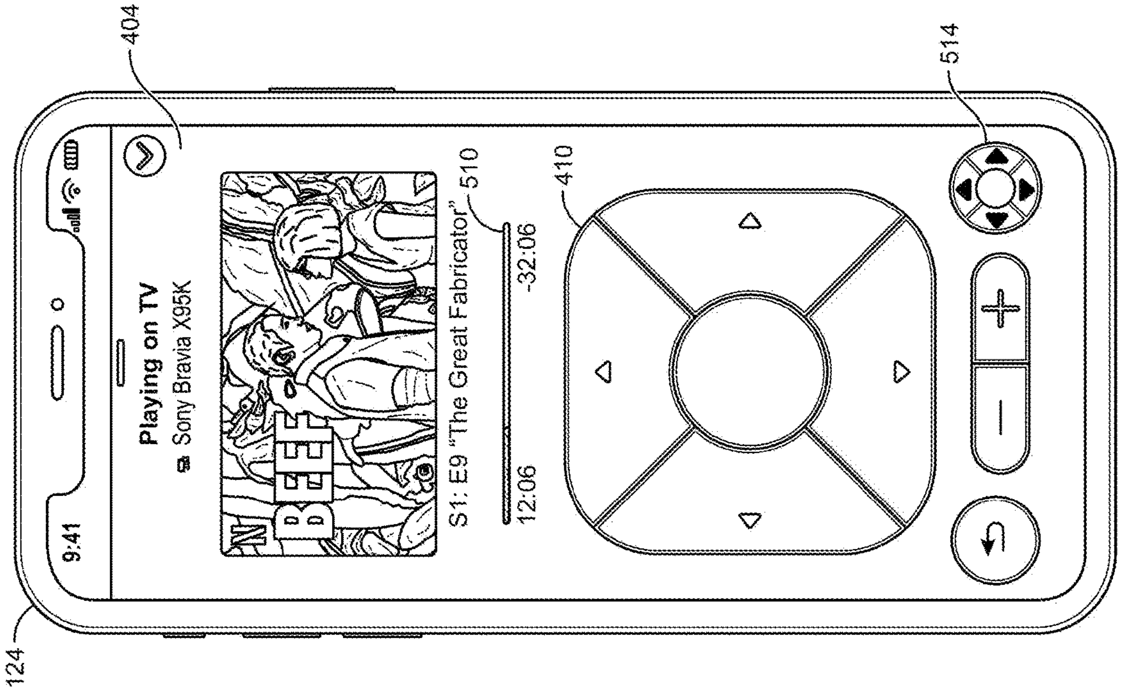

In one or more implementations, the dynamic control system 102 provides additional functionality within the playback control graphical user interface 404 during playback of a media item. For example, in response to a detected selection of the LRUD control switch 514, the dynamic control system 102 modifies the playback control graphical user interface 404 by adding the LRUD control 410 as shown in FIG. 5E. The dynamic control system 102 further modifies the playback control graphical user interface 404 by moving the playback scrubber 510 to accommodate the LRUD control 410 and changing the appearance of the LRUD control switch 514 to indicate it has been selected (e.g., by changing a color within the LRUD control switch 514). In some examples, the dynamic control system 102 automatically adds the LRUD control 410 in response to determining a context change associated with a media item such as when current playback of the media item enters an interactive media item portion where the viewer may select an option, interact with a character, or so forth.

Figure 5F:
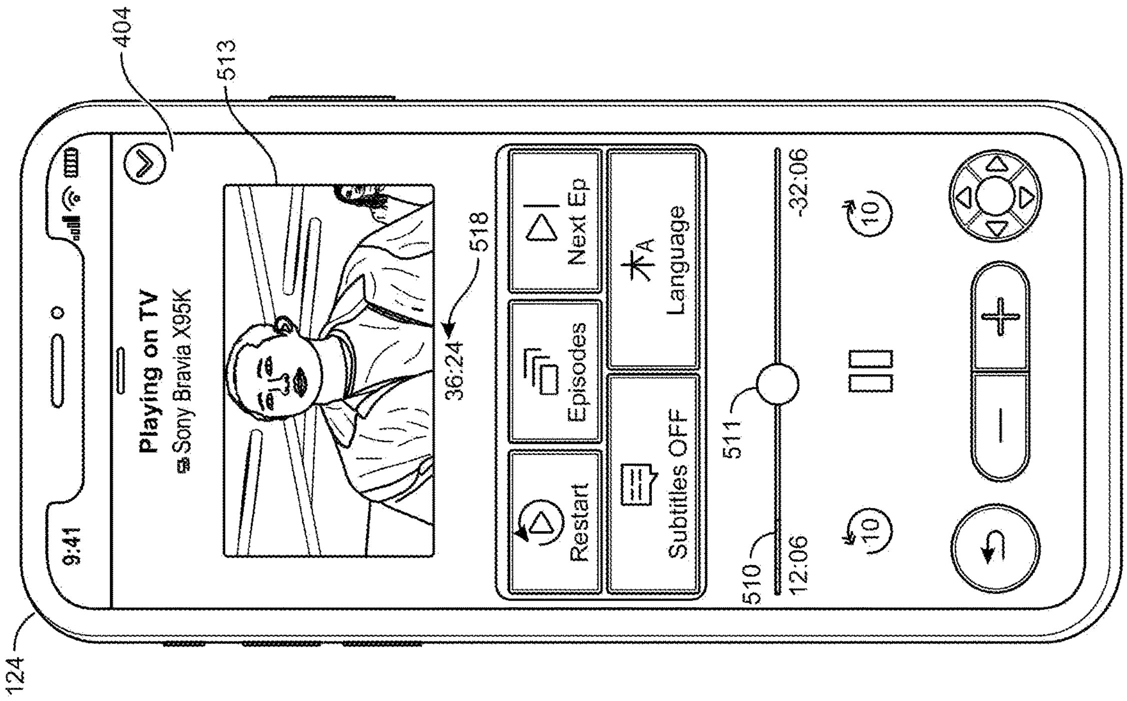

In at least one example, the dynamic control system 102 enables media item scrubbing on the second screen device 124 while the media item playback proceeds normally on the first screen device 114. For example, as shown in FIG. 5F and in response to detecting an interaction that moves a playback position indicator 511 within the playback scrubber 510, the dynamic control system 102 converts the media item indicator 506 to a playback preview 513 within the playback control graphical user interface 404 on the second screen device 124. Thus, the viewer can slide and hold the playback position indicator 511 and view the playback preview 513 on the second screen device 124 while normal playback continues on the first screen device 114—in order to find a new desired playback position. In one example, the dynamic control system 102 further provides a scrubbed playback position indicator 518 to assist the viewer in scrubbing the media item. In response to a detected release of the playback position indicator 511, the dynamic control system 102 updates the live playback position of the media item on the first screen device 114 to correspond with the playback position indicator 511 on the second screen device 124. As such, the dynamic control system 102 enables the viewer to scrub through the media item without interrupting live playback of the media item on the first screen device 114.

Figure 5G:
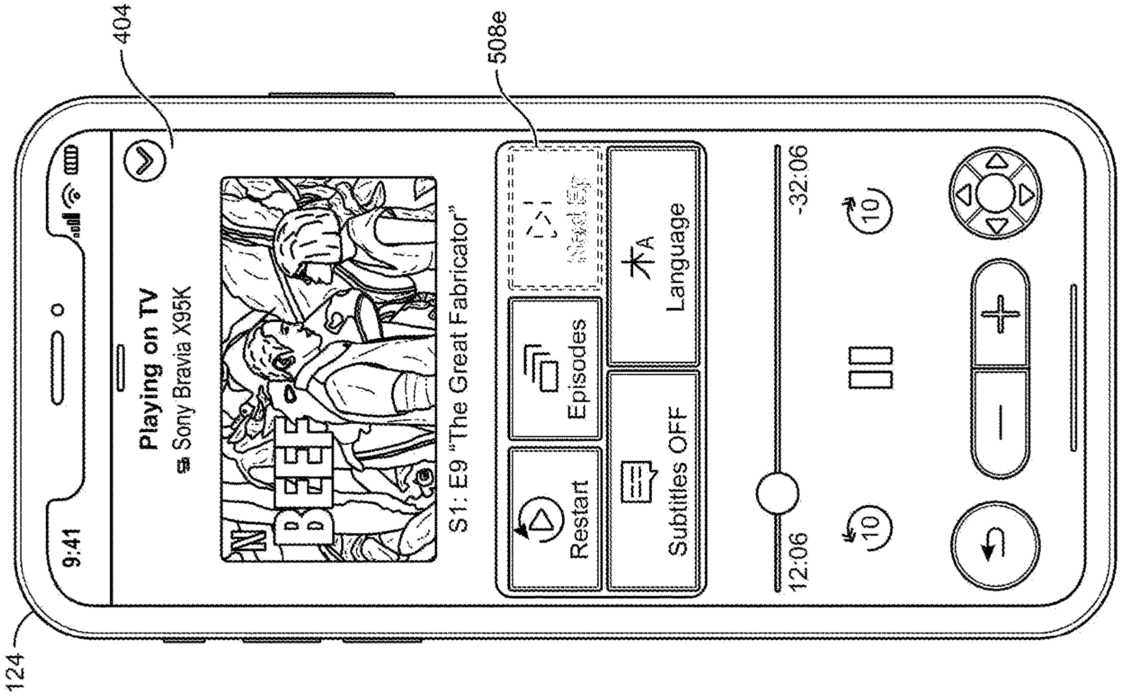
Figure 5I:
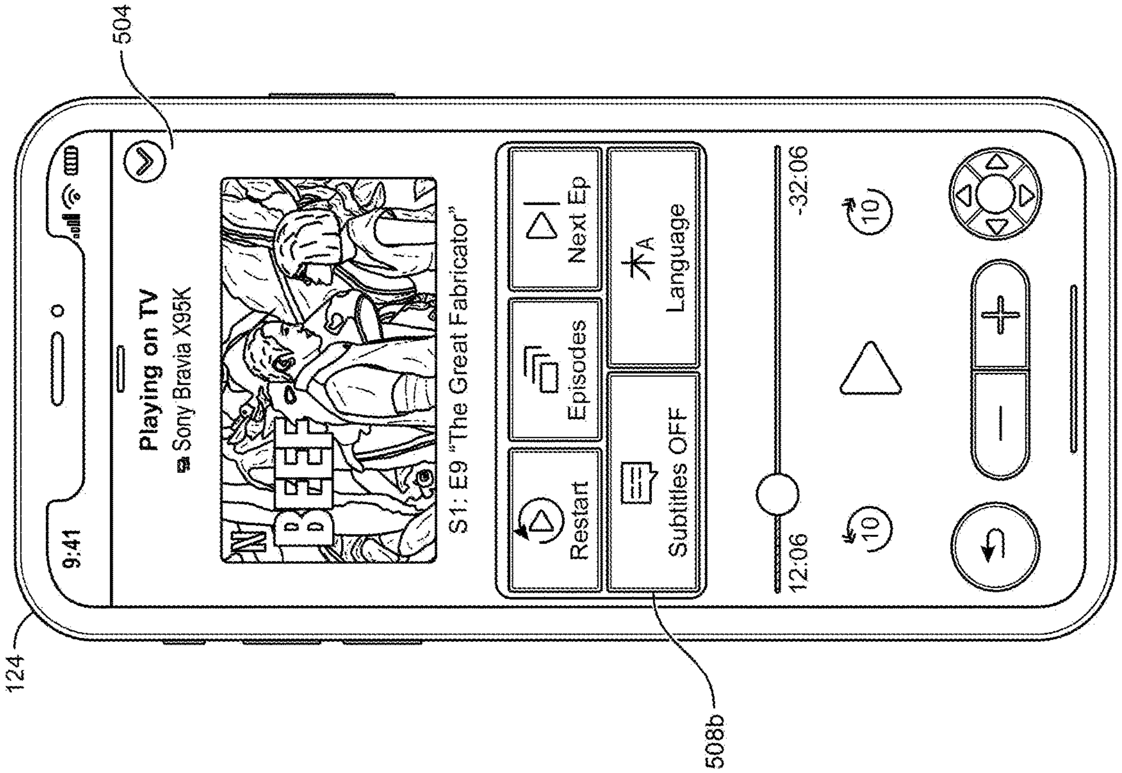
Figure 5H:
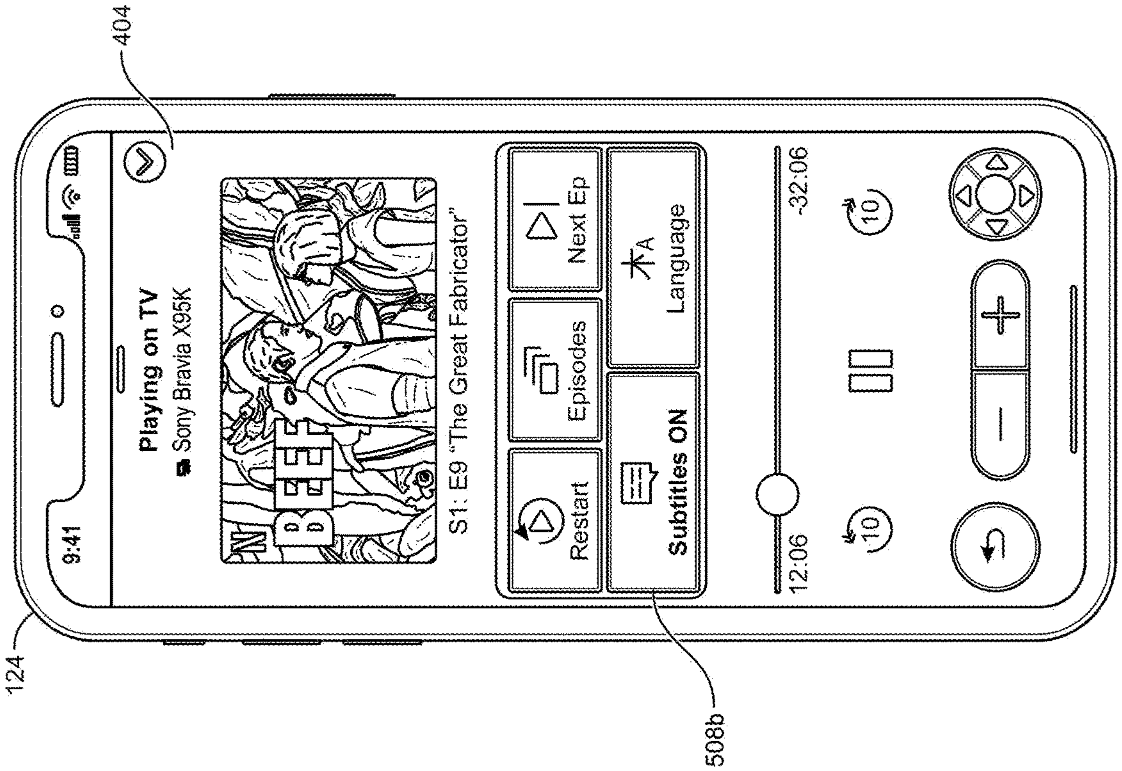

In one or more implementations, the dynamic control system 102 modifies or disables components of the playback control graphical user interface 404 based on the context of a media item. For example, as shown in FIG. 5G, the dynamic control system 102 disables the next episode option 508*e* in response to determining that the currently playing media item is the last episode in a series of TV episodes. Furthermore, as shown in FIGS. 5H and 5I, the dynamic control system 102 modifies or updates the playback control graphical user interface 404 in response to determining that subtitles associated with the current media item are either turned on (e.g., as demonstrated by the playback option 508*b* in FIG. 5H) or off (e.g., as demonstrated by the playback option 508*b* in FIG. 5I).

Figure 5K:
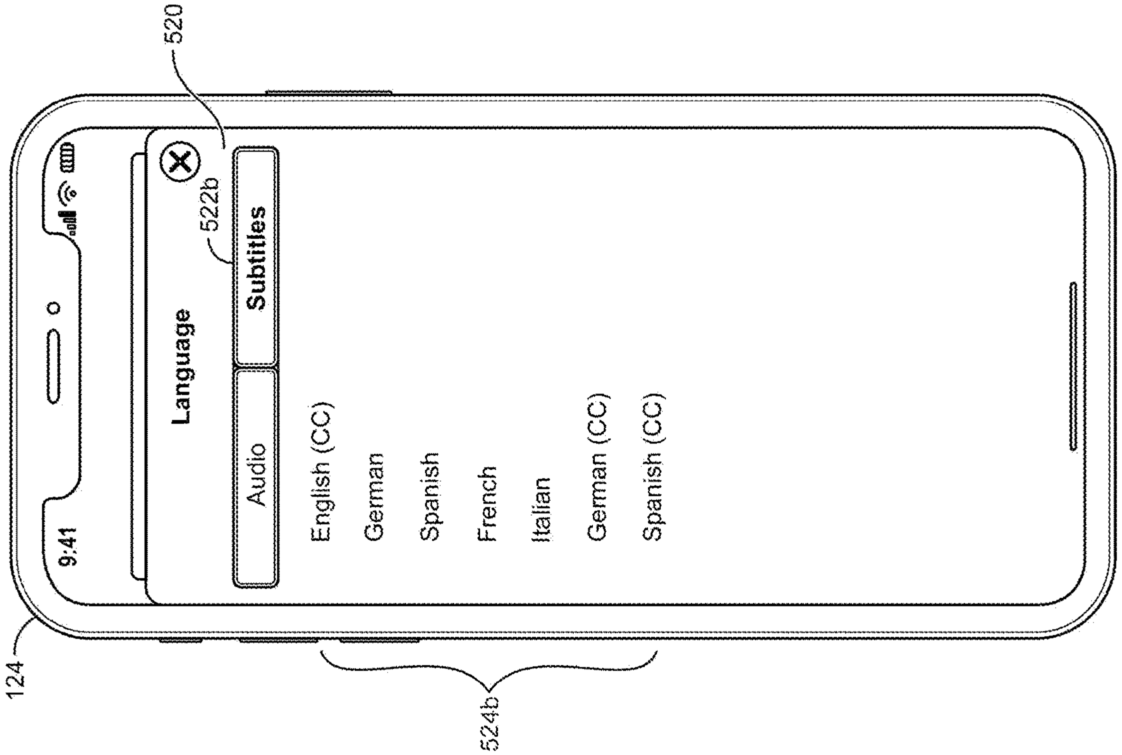
Figure 5J:
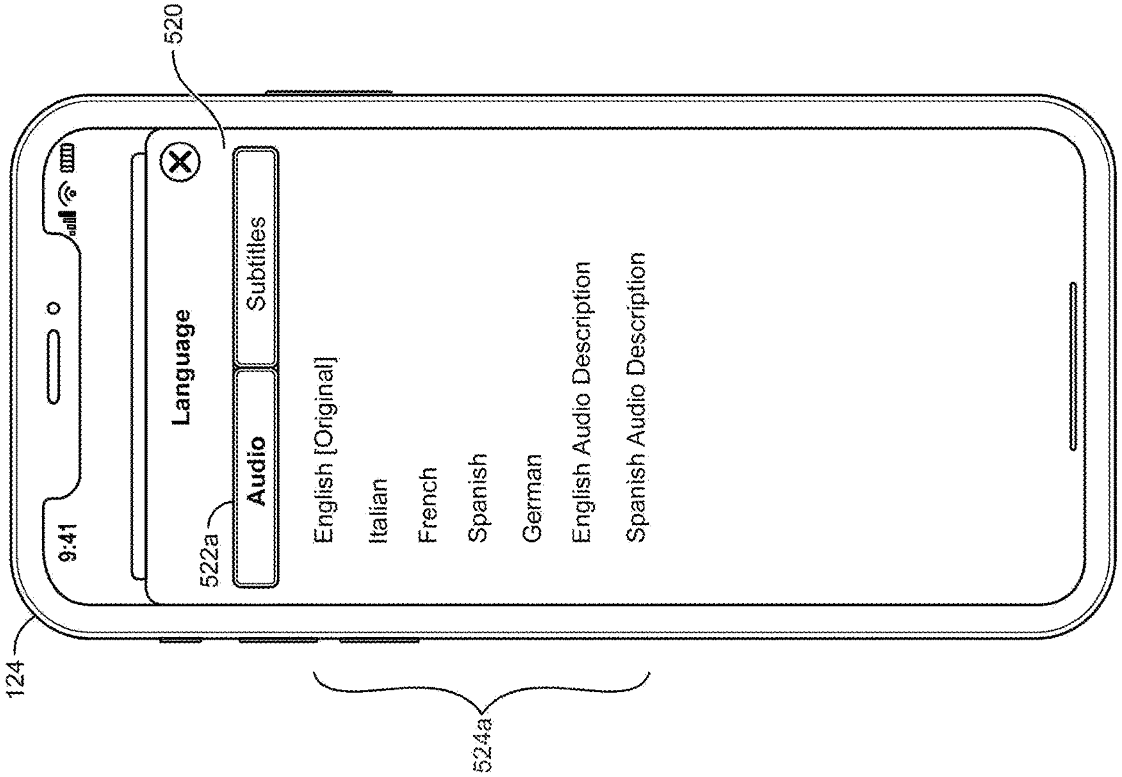

In at least one implementation, the dynamic control system 102 supports various language options associated with media items. For example, as shown in FIGS. 5J and 5K, the dynamic control system 102 overlays a language setting user interface 520 on the touch screen display of the second screen device 124 in response to a detected selection of the playback option 508*c*. As shown in FIG. 5J, the dynamic control system 102 provides audio language options 524*a* in response to a detected selection of an audio selector 522*a*. Similarly, as shown in FIG. 5K, the dynamic control system 102 provides subtitle language options 524*b* in response to a detected selection of a subtitle selector 522*b*. The dynamic control system 102 then changes the audio and subtitle languages associated with a media item (e.g., a media item being played back via the first screen device 114) based on selections within the audio language options 524*a* and the subtitle language options 524*b*.

Figure 5L:
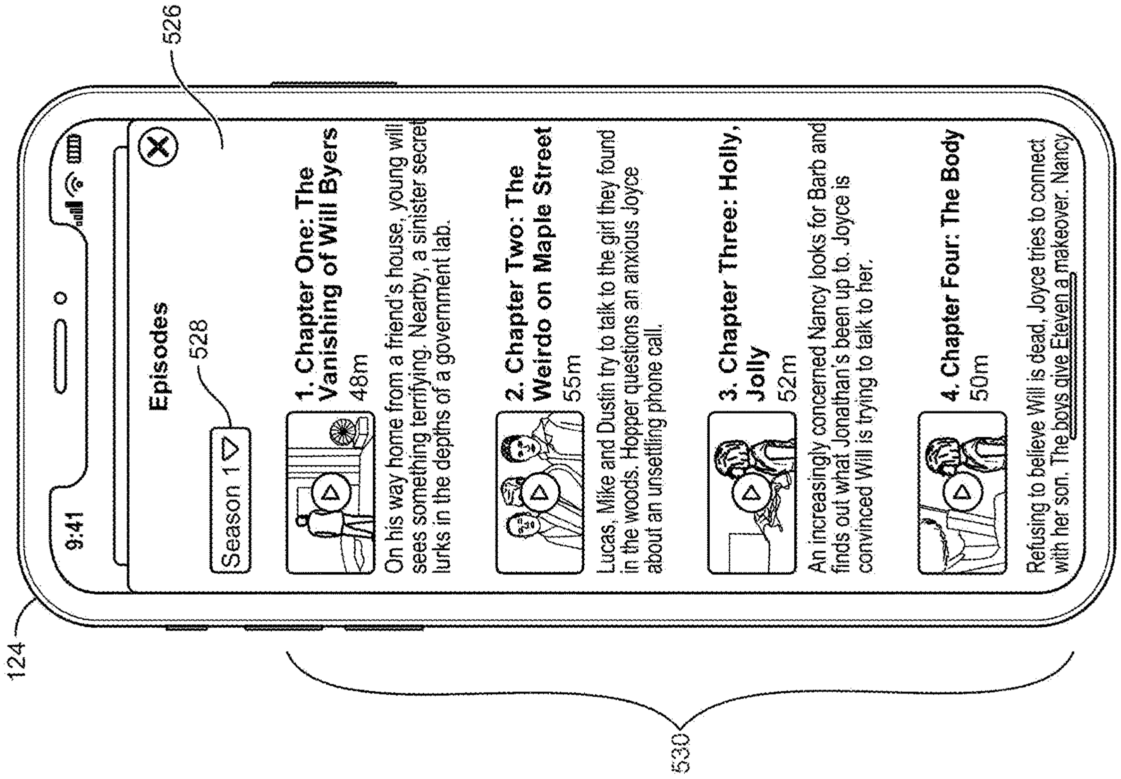

Moreover, as shown in FIG. 5L, the dynamic control system 102 also overlays an episode selection user interface 526 on the touch screen display of the second screen device 124 in response to a detected selection of the episode option 508*d* (e.g., as shown in FIG. 5C). In one or more implementations, the dynamic control system 102 generates or causes the second screen device 124 to generate the episode selection user interface 526 including an episode listing 530. In at least one example, the episode listing 530 includes selectable episode options along with descriptions of each episode in each season of a TV show. From the episode selection user interface 526, the dynamic control system 102 enables the viewer to select a different episode than the episode currently playing for immediate playback via the first screen device 114.

In some examples, the dynamic control system 102 causes the second screen device 124 to continuously display the playback control graphical user interface 404 while a current media item is playing on the first screen device 114. In additional examples, the dynamic control system 102 allows the second screen device 124 to lock after a predetermined amount of time where no activity is detected via the playback control graphical user interface 404. In that example, the dynamic control system 102 further provides additional information via a lock screen of the 124.

To illustrate, FIG. 6A shows a lock screen 602 of the second screen device 124. While the media item is actively playing on the first screen device 114, the dynamic control system 102 displays a media item control 604 on the lock screen 602. In one or more implementations, the dynamic control system 102 generates the media item control 604 including indicators of the media item currently playing, the first screen device 114 where the media item is currently playing, a scrub bar, and other playback controls. In at least one implementation, the dynamic control system 102 enables the viewer to pause, play, skip, and scrub the media item directly from the media item control 604.

In additional implementations, the dynamic control system 102 adds additional or different media item information on the lock screen 602 of the second screen device 124. In one example, as shown in FIG. 6B, the dynamic control system 102 provides the media item control 604 along with an enlarged media item indicator 606. In another example, as shown in FIG. 6C, the dynamic control system 102 provides an enriched media item control 608 that includes playback controls superimposed over the media item indicator.

As mentioned above, the dynamic control system 102 enables the second screen device 124 to act as a controller in connection with a media item playing on the first screen device 114 by first pairing the second screen device 124 and the first screen device 114. FIGS. 7A and 7B illustrate additional detail with regard to this pairing process. For example, as shown in FIG. 7A, the process begins at step 702 when the first screen device 114 connects to the server(s) 112 and submits a subscription request. In one or more implementations, the subscription request includes identification information that is unique to the first screen device 114. At step 704 the server(s) 112 passes the subscription request on to the dynamic control system 102. At step 706 and upon receiving the subscription request, the dynamic control system 102 generates a device subscription list including the identification information from the first screen device 114—or adds the same identification information to an existing device subscription list.

At step 708, the server(s) 112 receives an additional subscription request from the second screen device 124. As with the subscription request from the first screen device 114, this additional subscription request includes identification information that is unique to the second screen device 124. At step 710, the server(s) 112 further transmits the additional subscription request to the dynamic control system 102, where the dynamic control system 102 adds the second screen device 124 to the device subscription list at step 712.

With the addition of a new device to the device subscription list, the dynamic control system 102 determines that the device subscription list has changed at step 714. In response to this determination, the dynamic control system 102 transmits the updated subscription list to one or more devices indicated by the same list. Thus, at step 716, the dynamic control system 102 transmits the updated device subscription list to the server(s) 112, which forwards the updated device subscription list to at least the first screen device 114 at step 718.

In some implementations, devices may also periodically request the device subscription list. For example, at step 720, the second screen device 124 submits a request for the device subscription list to the server(s) 112. The server(s) 112 requests and receives the updated device subscription list from the dynamic control system 102 at steps 722 and 724. The server(s) 112 can then transmit the updated device subscription list to the second screen device 124 at step 726—thereby pairing the first screen device 114 and the second screen device 124. In at least one implementation, the dynamic control system 102 pairs the first screen device 114 and the second screen device 124 only when both devices are signed into the same digital content system account.

Moreover, in some implementations, the dynamic control system 102 includes and utilizes additional information in the device subscription list. To illustrate, in one example, the dynamic control system 102 tracks information identifying a specific profile within the digital content system account into which a screen device is signed. In that example, the digital content system account includes multiple profiles (e.g., for family members within a household). As such, when the second screen device 124 determines which devices to include for pairing (e.g., within the pairing option list user interface 304 as shown in FIG. 3A) by determining whether each available screen device is signed into the same profile, a different profile, or no profile within the same digital content system account. In response to determining that a particular screen device is signed into a different profile within the same digital content system account, the second screen device 124 will determine to not include that screen device within the pairing option list user interface 304).

In at least one implementation, the first screen device 114 and the second screen device 124 are paired once both devices have their identifying information on the device subscription list. At this point, as shown in FIG. 7B, the dynamic control system 102 facilitates messaging between the first screen device 114 and the second screen device 124 by pushing messages back and forth based on the identifying information in the device subscription list. For example, as shown in FIG. 7B, the dynamic control system 102 receives a message from the first screen device 114 at step 728 and pushes that message to the second screen device 124 at step 730. In additional examples, the dynamic control system 102 also receives and pushes messages in the other direction from the second screen device 124 to the first screen device 114. In this way, the dynamic control system 102 enables messaging between the first screen device 114 and the second screen device 124—even if the first screen device 114 and the second screen device 124 are not on the same network or sub-network.

As mentioned above, and as shown in FIG. 8, the dynamic control system 102 performs various functions in connection with determining media item contexts and dynamically modifying a playback control graphical user interface based on those determined contexts. FIG. 8 is a block diagram 400 of the dynamic control system 102 operating within the memory 106 of the server(s) 112 while performing these functions. As such, FIG. 8 provides additional detail with regard to these functions. For example, as shown in FIG. 8, the dynamic control system 102 includes a pairing manager 802, a communication manager 804, and a modification manager 806.

In certain implementations, the dynamic control system 102 represents one or more software applications, modules, or programs that, when executed by a computing device, may cause the computing device to perform one or more tasks. For example, and as will be described in greater detail below, one or more of the pairing manager 802, the communication manager 804, and the modification manager 806 may represent software stored and configured to run on one or more computing devices, such as the server(s) 112, the first screen device 114 and/or the second screen device 124. One or more of the pairing manager 802, the communication manager 804, and the modification manager 806 of the dynamic control system 102 shown in FIG. 8 may also represent all or portions of one or more special purpose computers to perform one or more tasks.

As mentioned above, and as shown in FIG. 8, the dynamic control system 102 includes the pairing manager 802. In one or more implementations, the pairing manager 802 performs the steps involved in pairing the first screen device 114 and the second screen device 124—potentially along with additional devices. For example, the pairing manager 802 receives subscription requests and adds devices to a device subscription list. The pairing manager 802 further communicates the device subscription list in response to adding new devices to the device subscription list. In this way, the pairing manager 802 pairs screen devices by maintaining unique identifying information for those screen devices in association with each other.

As mentioned above, and as shown in FIG. 8, the dynamic control system 102 includes the communication manager 804. In one or more implementations, the communication manager 804 communicates electronic messages and/or instructions between paired display devices. As discussed above, once the pairing manager 802 pairs two or more display devices, the communication manager 804 pushes messages and/or instructions between the two or more display devices based on the unique identifying information maintained on the device subscription list.

As mentioned above, and as shown in FIG. 8, the dynamic control system 102 includes the modification manager 806. In one or more implementations, the modification manager 806 determines a context or a context change associated with a media item and generates instructions that trigger modifications to a playback control graphical user interface. For example, as described above, the modification manager 806 determines a type associated with a media item, whether playback of the media item has been initiated or paused, a portion of the media item that is currently playing, whether the media item is a last episode, whether a subtitle selection associated with the media item has been made, etc. In response to determining the context or context change associated with the media item, the modification manager 806 generates graphical user interfaces—or instructions that cause the graphical user interfaces to be rendered—based on the determined context or context change.

As shown in FIGS. 1 and 8, the first screen device 114 and the second screen device 124 include the physical processors 122*a* and 122*b* while the server(s) 112 includes the physical processor 110. The physical processors 122*a*, 112*b* and 110 generally represent any type or form of hardware-implemented processing unit capable of interpreting and/or executing computer readable instructions. In one implementation, the physical processors 122*a*, 112*b* and 110 access and/or modify one or more of the components of the dynamic control system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the first screen device 114 and the second screen device 124 include the memories 116*a* and 116*b* while the server(s) 112 include the memory 106. In one or more implementations, the memories 116*a*, 116*b*, and 106 generally represent any type or form of volatile or non-volatile storage device or medium capable of storing data and/or computer readable instructions. In one example, the memories 116*a*, 116*b*, and 106 may store, load, and/or maintain one or more of the components of the dynamic control system 102. Examples of the memories 116*a*, 116*b*, and 106 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 8, the first screen device 114 and the second screen device 124 include additional items 120*a* and 120*b* while the server(s) 112 includes the additional items 108. On the first screen device 114 and the second screen device 124, the additional items 120*a*, 120*b* include identifying information that is unique to the first screen device 114 and second screen device 124, respectively. In some examples, the additional items 120*a*, 120*b* also include predetermined instructions for modifying a playback control graphical user interface (e.g., in the event that the dynamic control system 102 exists on the client-side and receives electronic messages on one or both of the first screen device 114 and the second screen device 124). On the server(s) 112, the additional items 108 includes modification instructions and other heuristics for generating instructions that cause one or both of the first screen device 114 and the second screen device 124 to render or re-render graphical user interfaces.

In summary, the dynamic control system 102 enables viewers to simultaneously interact with media items via two or more display devices. For example, as discussed above, the dynamic control system 102 pairs display devices under the same digital content system account—even if those devices are not on the same network. Once the display devices are paired, the dynamic control system 102 causes modifications to one or more graphical user interfaces based on a context of a media item. In this way, the dynamic control system 102 dynamically provides user interface components that are most relevant to a specific media item and what is currently happening in connection with that media item. As such, the dynamic control system 102 provides viewers with a more engaging experience while browsing, selecting, and watching media items via the digital content system 104.

The following will provide, with reference to FIG. 9, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-8.

FIG. 9 is a block diagram of a content distribution ecosystem 900 that includes a distribution infrastructure 910 in communication with a content player 920. In some embodiments, distribution infrastructure 910 is configured to encode data at a specific data rate and to transfer the encoded data to content player 920. Content player 920 is configured to receive the encoded data via distribution infrastructure 910 and to decode the data for playback to a user. The data provided by distribution infrastructure 910 includes, for example, audio, video, text, images, animations, interactive content, haptic data, virtual or augmented reality data, location data, gaming data, or any other type of data that is provided via streaming.

Distribution infrastructure 910 generally represents any services, hardware, software, or other infrastructure components configured to deliver content to end users. For example, distribution infrastructure 910 includes content aggregation systems, media transcoding and packaging services, network components, and/or a variety of other types of hardware and software. In some cases, distribution infrastructure 910 is implemented as a highly complex distribution system, a single media server or device, or anything in between. In some examples, regardless of size or complexity, distribution infrastructure 910 includes at least one physical processor 912 and memory 914. One or more modules 916 are stored or loaded into memory 914 to enable adaptive streaming, as discussed herein.

Content player 920 generally represents any type or form of device or system capable of playing audio and/or video content that has been provided over distribution infrastructure 910. Examples of content player 920 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 910, content player 920 includes a physical processor 922, memory 924, and one or more modules 926. Some or all of the adaptive streaming processes described herein is performed or enabled by modules 926, and in some examples, modules 916 of distribution infrastructure 910 coordinate with modules 926 of content player 920 to provide adaptive streaming of digital content.

In certain embodiments, one or more of modules 916 and/or 926 in FIG. 9 represent one or more software applications or programs that, when executed by a computing device, cause the computing device to perform one or more tasks. For example, and as will be described in greater detail below, one or more of modules 916 and 926 represent modules stored and configured to run on one or more general-purpose computing devices. One or more of modules 916 and 926 in FIG. 9 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 912 and 922 generally represent any type or form of hardware-implemented processing unit capable of interpreting and/or executing computer readable instructions. In one example, physical processors 912 and 922 access and/or modify one or more of modules 916 and 926, respectively. Additionally or alternatively, physical processors 912 and 922 execute one or more of modules 916 and 926 to facilitate adaptive streaming of digital content. Examples of physical processors 912 and 922 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 914 and 924 generally represent any type or form of volatile or non-volatile storage device or medium capable of storing data and/or computer-readable instructions. In one example, memory 914 and/or 924 stores, loads, and/or maintains one or more of modules 916 and 926. Examples of memory 914 and/or 924 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 10 is a block diagram of exemplary components of distribution infrastructure 910 according to certain embodiments. Distribution infrastructure 910 includes storage 1010, services 1020, and a network 1030. Storage 1010 generally represents any device, set of devices, and/or systems capable of storing content for delivery to end users. Storage 1010 includes a central repository with devices capable of storing terabytes or petabytes of data and/or includes distributed storage systems (e.g., appliances that mirror or cache content at Internet interconnect locations to provide faster access to the mirrored content within certain regions). Storage 1010 is also configured in any other suitable manner.

As shown, storage 1010 may store a variety of different items including content 1012, user data 1014, and/or log data 1016. Content 1012 includes television shows, movies, video games, user-generated content, and/or any other suitable type or form of content. User data 1014 includes personally identifiable information (PII), payment information, preference settings, language and accessibility settings, and/or any other information associated with a particular user or content player. Log data 1016 includes viewing history information, network throughput information, and/or any other metrics associated with a user's connection to or interactions with distribution infrastructure 910.

Services 1020 includes personalization services 1022, transcoding services 1024, and/or packaging services 1026. Personalization services 1022 personalize recommendations, content streams, and/or other aspects of a user's experience with distribution infrastructure 910. Transcoding services 1024 compress media at different bitrates which, as described in greater detail below, enable real-time switching between different encodings. Packaging services 1026 package encoded video before deploying it to a delivery network, such as network 1030, for streaming.

Network 1030 generally represents any medium or architecture capable of facilitating communication or data transfer. Network 1030 facilitates communication or data transfer using wireless and/or wired connections. Examples of network 1030 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 10, network 1030 includes an Internet backbone 1032, an internet service provider network 1034, and/or a local network 1036. As discussed in greater detail below, bandwidth limitations and bottlenecks within one or more of these network segments triggers video and/or audio bit rate adjustments.

FIG. 11 is a block diagram of an exemplary implementation of content player 920 of FIG. 9. Content player 920 generally represents any type or form of computing device capable of reading computer-executable instructions. Content player 920 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 11, in addition to processor 922 and memory 924, content player 920 includes a communication infrastructure 1102 and a communication interface 1122 coupled to a network connection 1124. Content player 920 also includes a graphics interface 1126 coupled to a graphics device 1128, an audio interface 1130 coupled to an audio device 1132, an input interface 1134 coupled to an input device 1136, and a storage interface 1138 coupled to a storage device 1140.

Communication infrastructure 1102 generally represents any type or form of infrastructure capable of facilitating communication between one or more components of a computing device. Examples of communication infrastructure 1102 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 924 generally represents any type or form of volatile or non-volatile storage device or medium capable of storing data and/or other computer-readable instructions. In some examples, memory 924 stores and/or loads an operating system 1108 for execution by processor 922. In one example, operating system 1108 includes and/or represents software that manages computer hardware and software resources and/or provides common services to computer programs and/or applications on content player 920.

Operating system 1108 performs various system management functions, such as managing hardware components (e.g., graphics interface 1126, audio interface 1130, input interface 1134, and/or storage interface 1138). Operating system 1108 also provides process and memory management models for playback application 1110. The modules of playback application 1110 includes, for example, a content buffer 1112, an audio decoder 1118, and a video decoder 1120.

Playback application 1110 is configured to retrieve digital content via communication interface 1122 and play the digital content through graphics interface 1126 and audio interface 1130. Graphics interface 1126 is configured to transmit a rendered video signal to graphics device 1128. Audio interface 1130 is configured to transmit a rendered audio signal to audio device 1132. In normal operation, playback application 1110 receives a request from a user to play a specific title or specific content. Playback application 1110 then identifies one or more encoded video and audio streams associated with the requested title.

In one embodiment, playback application 1110 begins downloading the content associated with the requested title by downloading sequence data encoded to the lowest audio and/or video playback bitrates to minimize startup time for playback. The requested digital content file is then downloaded into content buffer 1112, which is configured to serve as a first-in, first-out queue. In one embodiment, each unit of downloaded data includes a unit of video data or a unit of audio data. As units of video data associated with the requested digital content file are downloaded to the content player 920, the units of video data are pushed into the content buffer 1112. Similarly, as units of audio data associated with the requested digital content file are downloaded to the content player 920, the units of audio data are pushed into the content buffer 1112. In one embodiment, the units of video data are stored in video buffer 1116 within content buffer 1112 and the units of audio data are stored in audio buffer 1114 of content buffer 1112.

A video decoder 1120 reads units of video data from video buffer 1116 and outputs the units of video data in a sequence of video frames corresponding in duration to the fixed span of playback time. Reading a unit of video data from video buffer 1116 effectively de-queues the unit of video data from video buffer 1116. The sequence of video frames is then rendered by graphics interface 1126 and transmitted to graphics device 1128 to be displayed to a user.

An audio decoder 1118 reads units of audio data from audio buffer 1114 and outputs the units of audio data as a sequence of audio samples, generally synchronized in time with a sequence of decoded video frames. In one embodiment, the sequence of audio samples is transmitted to audio interface 1130, which converts the sequence of audio samples into an electrical audio signal. The electrical audio signal is then transmitted to a speaker of audio device 1132, which, in response, generates an acoustic output.

In situations where the bandwidth of distribution infrastructure 910 is limited and/or variable, playback application 1110 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1126 is configured to generate frames of video data and transmit the frames of video data to graphics device 1128. In one embodiment, graphics interface 1126 is included as part of an integrated circuit, along with processor 922. Alternatively, graphics interface 1126 is configured as a hardware accelerator that is distinct from (i.e., is not integrated within) a chipset that includes processor 922.

Graphics interface 1126 generally represents any type or form of device configured to forward images for display on graphics device 1128. For example, graphics device 1128 is fabricated using liquid crystal display (LCD) technology, cathode-ray technology, and light emitting diode (LED) display technology (either organic or inorganic). In some embodiments, graphics device 1128 also includes a virtual reality display and/or an augmented reality display. Graphics device 1128 includes any technically feasible means for generating an image for display. In other words, graphics device 1128 generally represents any type or form of device capable of visually displaying information forwarded by graphics interface 1126.

As illustrated in FIG. 11, content player 920 also includes at least one input device 1136 coupled to communication infrastructure 1102 via input interface 1134. Input device 1136 generally represents any type or form of computing device capable of providing input, either computer or human generated, to content player 920. Examples of input device 1136 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 920 also includes a storage device 1140 coupled to communication infrastructure 1102 via a storage interface 1138. Storage device 1140 generally represents any type or form of storage device or medium capable of storing data and/or other computer readable instructions. For example, storage device 1140 is a magnetic disk drive, a solid-state drive, an optical disk drive, a flash drive, or the like. Storage interface 1138 generally represents any type or form of interface or device for transferring data between storage device 1140 and other components of content player 920.

Example Embodiments

Example 1: A computer-implemented method for dynamically modifying components of a playback control graphical user interface based on a context of a media item. For example, the method may include pairing a first screen device displaying a media item and a second screen device acting as a controller relative to the media item, determining a context associated with the media item, generating, based on the context, instructions to modify one or more components of a playback control graphical user interface displayed by the second screen device, and transmitting the instructions to the second screen device to trigger modification of the one or more components of the playback control graphical user interface.

Example 2: The computer-implemented method of Example 1, wherein pairing the first screen device displaying the media item and the second screen device acting as the controller includes receiving a device subscription request from the first screen device, generating a device subscription list including the first screen device, receiving a device subscription request from the second screen device, adding the second screen device to the device subscription list, transmitting the device subscription list to the first screen device, in response to receiving a request from the first screen device to pair with the second screen device, associating the first screen device and the second screen device.

Example 3: The computer-implemented method of any of Examples 1 and 2, further including, in response to associating the first screen device and the second screen device, receiving one or more messages from the first screen device, and pushing the one or more messages to the second screen device.

Example 4: The computer-implemented method of any of Examples 1-3, wherein pairing the first screen device and the second screen device is in response to a detected selection of the first screen device from a pairing option list displayed by the second screen device.

Example 5: The computer-implemented method of any of Examples 1-4, further including, in response to pairing the first screen device and the second screen device, causing the second screen device to display an indication of successful pairing within the playback control graphical user interface displayed by the second screen device, and causing the first screen device to display the indication of successful pairing within a media item graphical user interface displayed by the first screen device.

Example 6: The computer-implemented method of any of Examples 1-5, further including generating instructions to display the playback control graphical user interface on the second screen device, wherein the instructions to display the playback control graphical user interface are based on whether the media item is a standalone media item or an episodic media item.

Example 7: The computer-implemented method of any of Examples 1-6, wherein determining the context associated with the media item includes at least one of determining that playback of the media item has been initiated, determining that playback of the media item has entered an introduction portion of the media item, determining that the media item is a last episode in a collection of episodes, or determining that a subtitle selection associated with the media item has been made.

Example 8: The computer-implemented method of any of Examples 1-7, further including detecting one or more user selections of components within the playback control graphical user interface on the second screen device, and communicating the detected one or more selections to the first screen device.

Example 9: The computer-implemented method of any of Examples 1-8, wherein generating instructions to modify one or more components of the playback control graphical user interface includes one or more of generating instructions to provide a new component within the playback control graphical user interface, generating instructions to highlight an existing component within the playback control graphical user interface, generating instructions to modify an existing component within the playback control graphical user interface, or generating instructions to update a position of a playback scrubber within the playback control graphical user interface.

In some examples, a system may include at least one processor and a physical memory including computer-executable instructions that, when executed by the at least one processor, cause the at least one processor to perform various acts. For example, the computer executable instructions may cause the at least one processor to perform acts including pairing a first screen device displaying a media item and a second screen device acting as a controller relative to the media item, determining a context associated with the media item, generating, based on the context, instructions to modify one or more components of a playback control graphical user interface displayed by the second screen device, and transmitting the instructions to the second screen device to trigger modification of the one or more components of the playback control graphical user interface.

Additionally in some examples, a method may include receiving, at a second screen device via digital content system application, instructions to generate a control graphical user interface associated with a media item displayed on a first screen device, transmitting, in response to a detected selection of a pause/play button within the control graphical user interface, an electronic communication that initiates playback of the media item, receiving, at the second screen device via the digital content system application, instructions that trigger one or more modifications of the control graphical user interface based on playback of the media item entering an introduction portion of the media item, and modifying the control graphical user interface based on the received instructions. In one example, the method further includes receiving, at the second screen device via the digital content system application, additional instructions that trigger additional modifications of the control graphical user interface based on playback of the media item moving past the introduction portion of the media item, and modifying the control graphical user interface based on the received additional instructions.

Unless otherwise noted, the terms “connected to” and “coupled to” (and their derivatives), as used in the specification and claims, are to be construed as permitting both direct and indirect (i.e., via other elements or components) connection. In addition, the terms “a” or “an,” as used in the specification and claims, are to be construed as meaning “at least one of." Finally, for ease of use, the terms "including" and "having" (and their derivatives), as used in the specification and claims, are interchangeable with and have the same meaning as the word "comprising."

What is claimed is:

1. A computer-implemented method comprising:

pairing a first screen device displaying at least one media item and a second screen device acting as a controller relative to the at least one media item, such that a user simultaneously interacts with the at least one media item using the first screen device and the second screen device to control playback;

determining a first context associated with the at least one media item corresponding to a playback position;

generating, based on the first context, first instructions to modify one or more components of a graphical user interface displayed by the first screen device and second instructions to modify one or more components of a playback control graphical user interface displayed by the second screen device;

transmitting the first instructions to the first screen device to trigger modification of the one or more components of the graphical user interface and the second instructions to the second screen device to trigger modification of the one or more components of the playback control graphical user interface;

determining a second context associated with the at least one media item responsive to selection of the one or more components of the playback control graphical user interface;

generating, based on the second context, third instructions to revert one or more components of the graphical user interface displayed by the first screen device and fourth instructions to revert one or more components of the playback control graphical user interface displayed by the second screen device; and transmitting the third instructions to the first screen device to trigger revision of the one or more components of the graphical user interface and the fourth instructions to the second screen device to trigger reversion of the one or more components of the playback control graphical user interface.

2. The computer-implemented method of claim 1, wherein pairing the first screen device displaying the at least one media item and the second screen device acting as the controller comprises:

receiving a device subscription request from the first screen device;

generating a device subscription list including the first screen device;

receiving a device subscription request from the second screen device;

adding the second screen device to the device subscription list;

transmitting the device subscription list to the first screen device; and in response to receiving a request from the first screen device to pair with the second screen device, associating the first screen device and the second screen device.

3. The computer-implemented method of claim 2, further comprising, in response to associating the first screen device and the second screen device:

receiving one or more messages from the first screen device; and pushing the one or more messages to the second screen device.

4. The computer-implemented method of claim 1, wherein pairing the first screen device and the second screen device is in response to a detected selection of the first screen device from a pairing option list displayed by the second screen device.

5. The computer-implemented method of claim 4, further comprising, in response to pairing the first screen device and the second screen device:

causing the second screen device to display an indication of successful pairing within the playback control graphical user interface displayed by the second screen device; and causing the first screen device to display the indication of successful pairing within a media item graphical user interface displayed by the first screen device.

6. The computer-implemented method of claim 1, further comprising generating the second instructions to display the playback control graphical user interface on the second screen device, wherein the second instructions to display the playback control graphical user interface are based on whether the at least one media item is a standalone media item or an episodic media item.

7. The computer-implemented method of claim 1, wherein determining the context associated with the at least one media item comprises at least one of:

determining that playback of the at least one media item has been initiated;

determining that playback of the at least one media item has entered an introduction portion of the at least one media item;

determining that the at least one media item is a last episode in a collection of episodes; or determining that a subtitle selection associated with the at least one media item has been made.

8. The computer-implemented method of claim 7, further comprising:

detecting one or more user selections of components within the playback control graphical user interface on the second screen device; and communicating the one or more user selections to the first screen device.

9. The computer-implemented method of claim 1, wherein generating the second instructions to modify one or more components of the playback control graphical user interface comprises one or more of:

generating instructions to provide a new component within the playback control graphical user interface;

generating instructions to highlight an existing component within the playback control graphical user interface;

generating instructions to modify an existing component within the playback control graphical user interface; or generating instructions to update a position of a playback scrubber within the playback control graphical user interface.

10. A system comprising:

at least one physical processor; and physical memory comprising computer-executable instructions that, when executed by the at least one physical processor, cause the at least one physical processor to perform acts comprising:

pairing a first screen device displaying at least one media item and a second screen device acting as a controller relative to the at least one media item, such that a user simultaneously interacts with the at least one media item using the first screen device and the second screen device to control playback;

determining a first context associated with the at least one media item corresponding to a playback position;

generating, based on the first context, first instructions to modify one or more components of a graphical user interface displayed by the first screen device and second instructions to modify one or more components of a playback control graphical user interface displayed by the second screen device;

transmitting the first instructions to the first screen device to trigger modification of the one or more components of the graphical user interface and the second instructions to the second screen device to trigger modification of the one or more components of the playback control graphical user interface;

determining a second context associated with the at least one media item responsive to selection of the one or more components of the playback control graphical user interface;

generating, based on the second context, third instructions to revert one or more components of the graphical user interface displayed by the first screen device and fourth instructions to revert one or more components of the playback control graphical user interface displayed by the second screen device; and transmitting the third instructions to the first screen device to trigger revision of the one or more components of the graphical user interface and the fourth instructions to the second screen device to trigger reversion of the one or more components of the playback control graphical user interface.

11. The system of claim 10, wherein pairing the first screen device displaying the at least one media item and the second screen device acting as the controller comprises:

receiving a device subscription request from the first screen device;

generating a device subscription list including the first screen device;

receiving a device subscription request from the second screen device;

adding the second screen device to the device subscription list;

transmitting the device subscription list to the first screen device; and in response to receiving a request to pair with the second screen device from the first screen device, associating the first screen device and the second screen device.

12. The system of claim 11, further comprising computer-executable instructions that, when executed by the at least one physical processor, cause the at least one physical processor to perform acts comprising, in response to associating the first screen device and the second screen device:

receiving one or more messages from the first screen device; and pushing the one or more messages to the second screen device.

13. The system of claim 10, wherein pairing the first screen device and the second screen device is in response to a detected selection of the first screen device from a pairing option list displayed by the second screen device.

14. The system of claim 13, further comprising computer-executable instructions that, when executed by the at least one physical processor, cause the at least one physical processor to perform acts comprising, in response to pairing the first screen device and the second screen device:

causing the second screen device to display an indication of successful pairing within the playback control graphical user interface displayed by the second screen device; and causing the first screen device to display the indication of successful pairing within a media item graphical user interface displayed by the first screen device.

15. The system of claim 14, further comprising computer-executable instructions that, when executed by the at least one physical processor, cause the at least one physical processor to perform an act comprising generating the second instructions to display the playback control graphical user interface on the second screen device, wherein the second instructions to display the playback control graphical user interface are based on whether the at least one media item is a standalone media item or an episodic media item.

16. The system of claim 10, wherein determining the context associated with the at least one media item comprises at least one of:

determining that playback of the at least one media item has been initiated;

determining that playback of the at least one media item has entered an introduction portion of the at least one media item;

determining that the at least one media item is a last episode in a collection of episodes; or determining that a subtitle selection associated with the at least one media item has been made.

17. The system of claim 16, further comprising computer-executable instructions that, when executed by the at least one physical processor, cause the at least one physical processor to perform acts comprising:

detecting one or more user selections of components within the playback control graphical user interface on the second screen device; and communicating the one or more user selections to the first screen device.

18. The system of claim 10, wherein generating the second instructions to modify one or more components of the playback control graphical user interface comprises one or more of:

generating instructions to provide a new component within the playback control graphical user interface;

generating instructions to highlight an existing component within the playback control graphical user interface;

generating instructions to modify an existing component within the playback control graphical user interface; or generating instructions to update a position of a playback scrubber within the playback control graphical user interface.

19. A method comprising:

receiving, at a second screen device via digital content system application, instructions to generate a control graphical user interface associated with at least one media item displayed on a first screen device;

transmitting, in response to a detected selection of a pause/play button within the control graphical user interface, an electronic communication that initiates playback of the at least one media item;

receiving, at the second screen device via the digital content system application, first instructions that trigger one or more modifications of the control graphical user interface based on playback of the at least one media item entering an introduction portion of the at least one media item;

modifying the control graphical user interface based on the first instructions, such that a user simultaneously interacts with the at least one media item using the first screen device and the second screen device to control playback, wherein a graphical user interface displayed by the first screen device is modified based on a context of the at least one media item;

transmitting, in response to a detected playback position later in time than the introduction portion of the at least one media item, second instructions that trigger one or more second modifications of the control graphical user interface; and modifying the control graphical user interface based on the second instructions.

20. The method of claim 19, further comprising:

receiving, at the second screen device via the digital content system application, additional instructions that trigger additional modifications of the control graphical user interface based on playback of the at least one media item moving past the introduction portion of the at least one media item; and modifying the control graphical user interface based on the additional instructions.

* * * * *